United States Patent
Eckert et al.

(10) Patent No.: US 7,134,733 B2
(45) Date of Patent: Nov. 14, 2006

(54) METHOD AND SYSTEM FOR CONTROLLING BRAKE-APPLICATION ENERGY IN A VEHICLE COMBINATION

(75) Inventors: Horst Eckert, Rehburg-Loccum (DE); Arnd Gaulke, Ronnenberg (DE)

(73) Assignee: WABCO GmbH & Co., OHG, Hannover (DE)

( * ) Notice: Subject to any disclaimer, the term of this patent is extended or adjusted under 35 U.S.C. 154(b) by 0 days.

(21) Appl. No.: 10/743,334

(22) Filed: Dec. 22, 2003

(65) Prior Publication Data

US 2005/0017577 A1   Jan. 27, 2005

(30) Foreign Application Priority Data

Dec. 23, 2002   (DE) ................ 102 61 513

(51) Int. Cl.
   *B60T 7/20*   (2006.01)
(52) U.S. Cl. .............. 303/123; 303/9.69; 303/20; 701/70
(58) Field of Classification Search ........ 303/9.69, 303/123, 155, 177, 183, 20, 22.1, DIG. 1, 303/DIG. 2, DIG. 6; 701/70, 78, 83
   See application file for complete search history.

(56) References Cited

U.S. PATENT DOCUMENTS

| | | | |
|---|---|---|---|
| 5,482,359 A * | 1/1996 | Breen ................ | 303/9.69 |
| 5,986,544 A * | 11/1999 | Kaisers et al. .......... | 340/431 |
| 6,273,522 B1 * | 8/2001 | Feetenby et al. ....... | 303/7 |

FOREIGN PATENT DOCUMENTS

| | | |
|---|---|---|
| DE | 42 43 245 A1 | 6/1994 |
| DE | 44 38 252 A1 | 5/1996 |
| DE | 195 19 768 C2 | 12/1996 |
| EP | 0 357 983 B1 | 3/1990 |
| EP | 0 445 575 B1 | 9/1991 |
| EP | 0 697 314 B1 | 2/1996 |
| EP | 0 885 793 A2 | 12/1998 |

* cited by examiner

*Primary Examiner*—Melody M. Burch
(74) *Attorney, Agent, or Firm*—Kramer Levin Naftalis & Frankel LLP

(57) ABSTRACT

A method and system for controlling brake-application energy in a tractor-trailer vehicle combination, the tractor vehicle having an electronic braking system (EBS), wherein, during braking, a set deceleration value is determined and compared with an actual deceleration value, and a current brake-application energy reference value (kappa) is determined from the comparison. To effect automatic load-dependent brake-force control for the trailer vehicle and to realize rapid adaptation of the control system to driving and load conditions, set brake-application energy values for each of the tractor and trailer vehicles are determined from the set deceleration value, from a value depending on kappa, and from brake-application energy levels for each of the tractor and trailer vehicles, using sets of performance characteristics resident in the EBS to describe the dependencies of the brake-application energy levels for the tractor and trailer vehicles on kappa and/or on the axle-load ratio of the tractor vehicle.

29 Claims, 18 Drawing Sheets

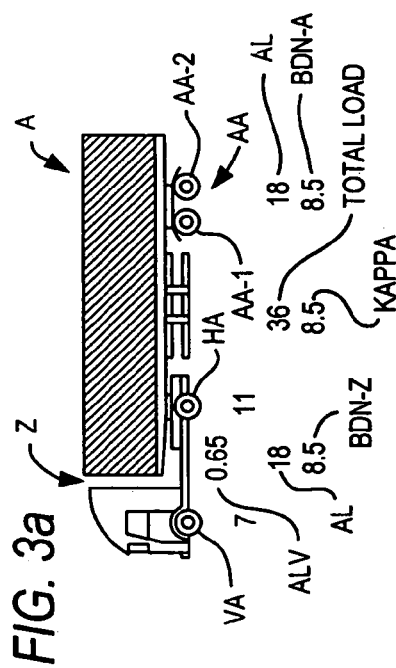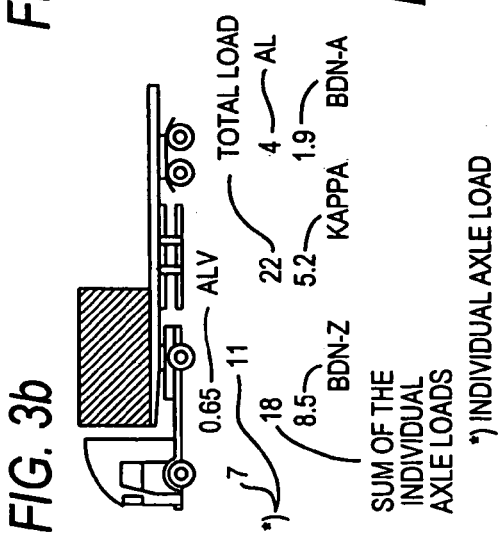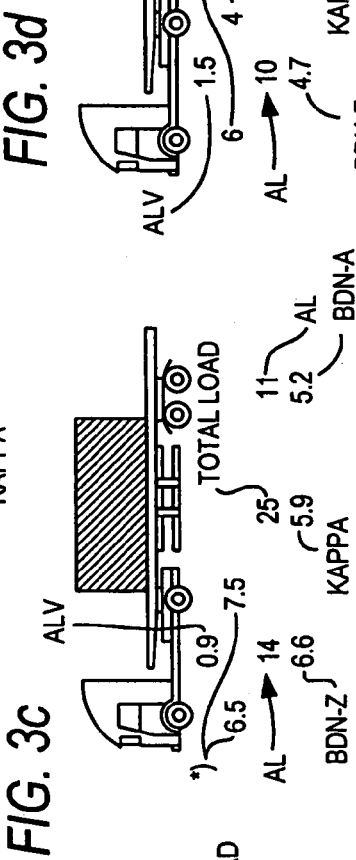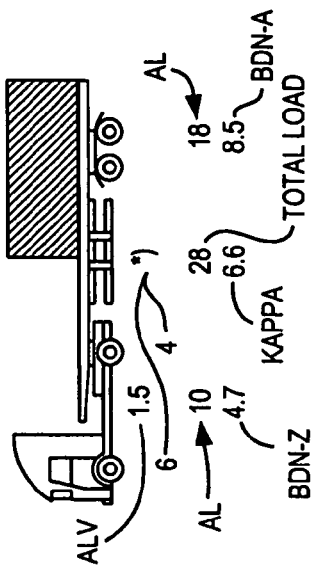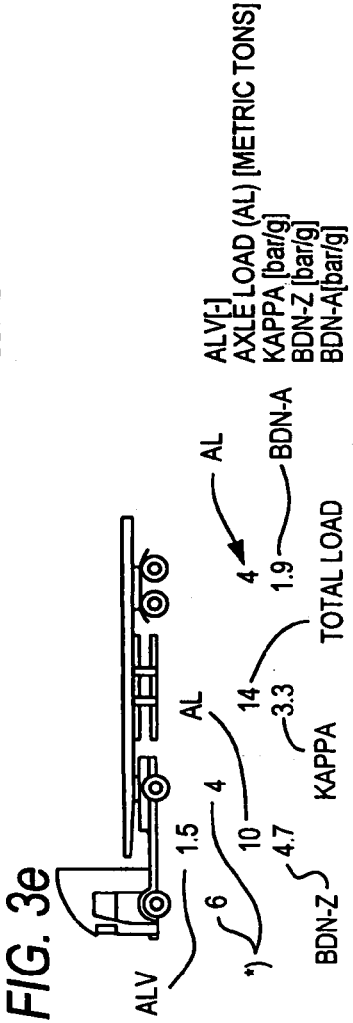

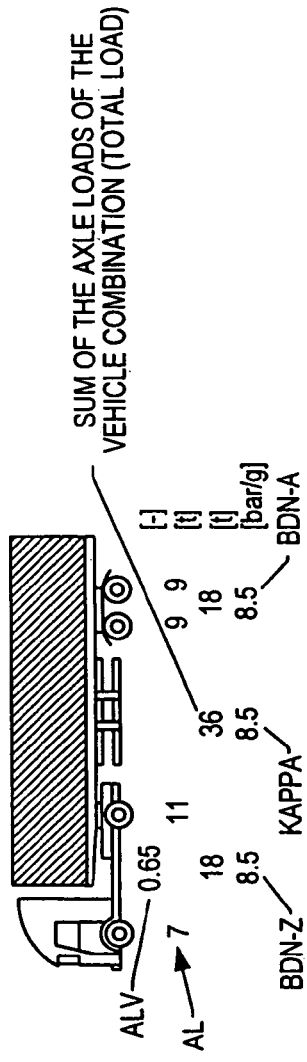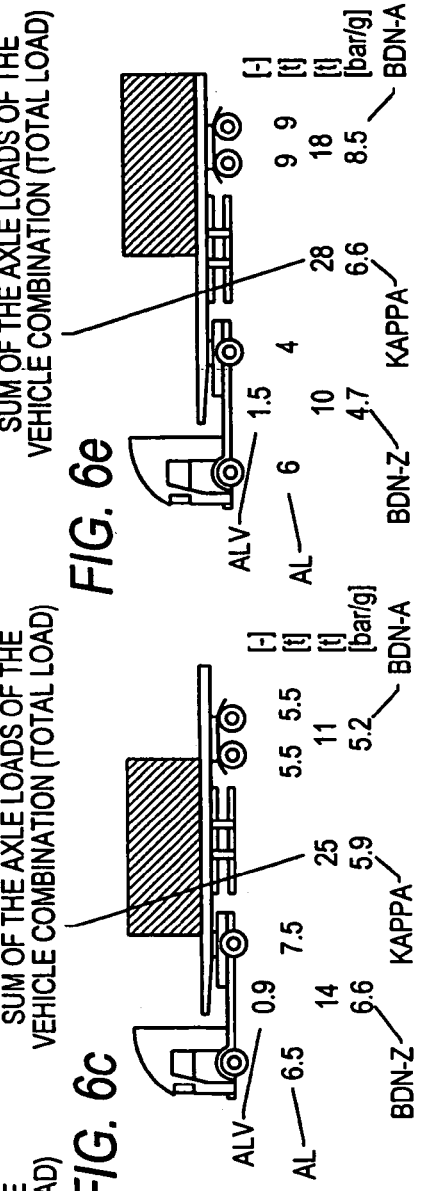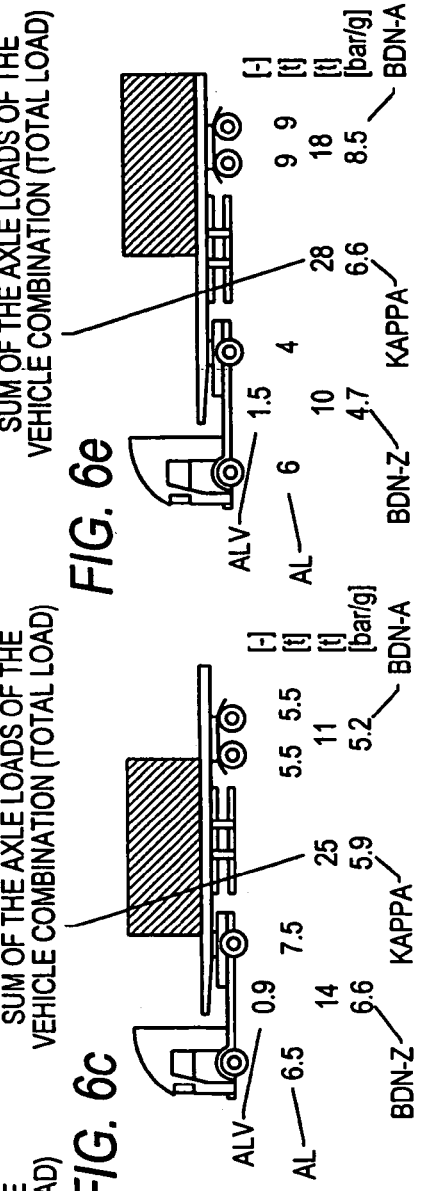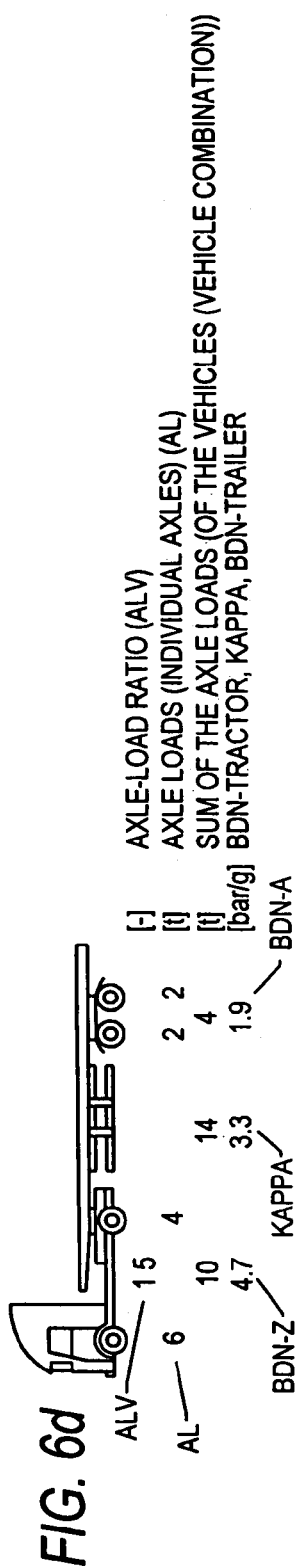

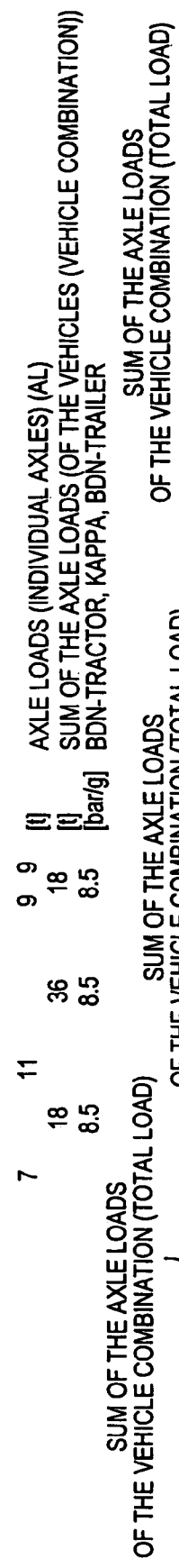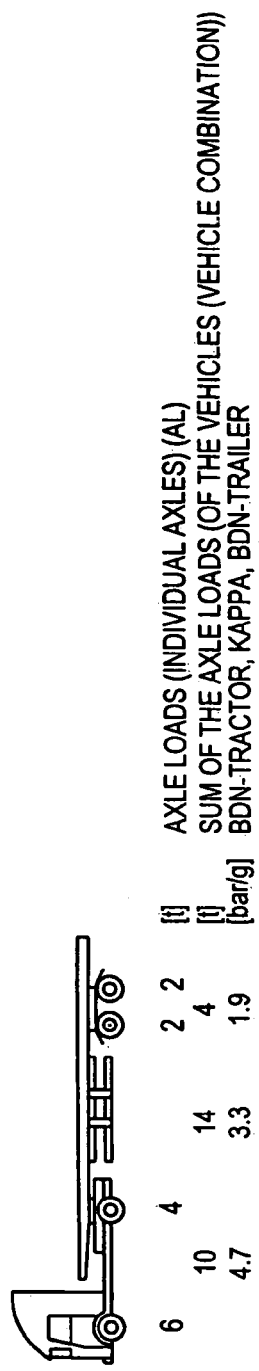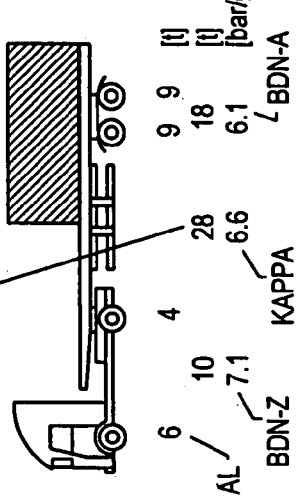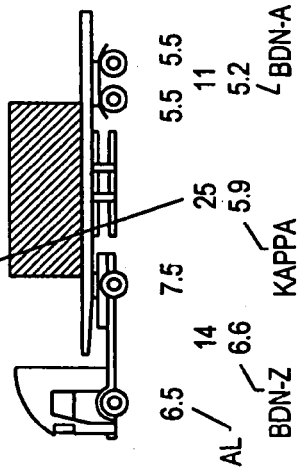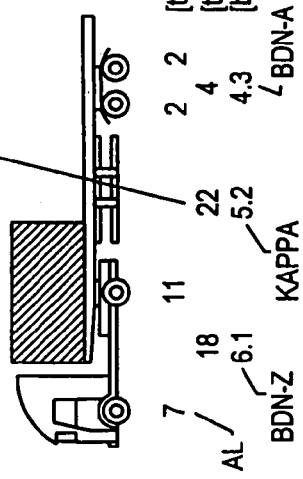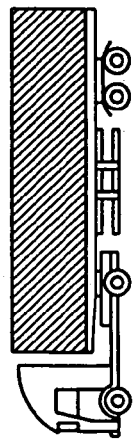
FIG. 7a FIG. 7b FIG. 7c FIG. 7d FIG. 7e

METHOD AND SYSTEM FOR CONTROLLING BRAKE-APPLICATION ENERGY IN A VEHICLE COMBINATION

BACKGROUND OF THE INVENTION

The present invention is directed generally to a method and system for controlling brake-application energy in a vehicle combination including a tractor vehicle equipped with an electronic braking system (EBS) and a trailer vehicle.

It is known that vehicle combinations (comprising a tractor vehicle having front and rear axles as well as a trailer vehicle) can be provided, on the one hand, with a vehicle deceleration control function, otherwise known as "Z-control," and, on the other hand, with coupling force control between the tractor vehicle and the trailer vehicle.

EP 0 697 314 B1 describes, for load-dependent control of brake pressure in a vehicle combination, a method designed to brake the trailer and tractor vehicles as equally as possible by appropriate distribution of brake pressure to the axles of the tractor vehicle and trailer vehicle. For this purpose, an initial value of a reference factor is determined by means of a set of performance characteristics resident in the tractor vehicle electronics and of the measured instantaneous tractor vehicle condition. The initial value is located in a band within the normal range; the reference factor is defined as the ratio of total brake pressure of the tractor vehicle to set vehicle deceleration (this ratio being a function of tractor vehicle condition data containing at least one description of load condition); and the set of performance characteristics containing a band of reference factor values within the normal range. The total brake pressure of the tractor vehicle is adjusted to a value specified by the initial value of the reference factor, and the brake pressure of the trailer vehicle is adjusted to a value, within a predetermined resident braking band, that corresponds to the selected set vehicle deceleration of the trailer vehicle.

According to EP 0 697 314 B1, during braking, the actual vehicle deceleration is measured and, if a deviation from the set vehicle deceleration is detected, the total brake pressure of the tractor vehicle is first corrected by readjusting the value of the reference factor in the band within the normal range. If the value of the reference factor reaches a limit point for the band within the normal range during such readjustment, the brake pressure for the trailer vehicle is readjusted in the predetermined braking band. Readjustment of the brake pressure for the trailer vehicle continues until the reference factor for the tractor vehicle total brake pressure corresponding to the altered trailer vehicle brake pressure is once again located in the band within the normal range.

The coupling force control function described in EP 0 697 314 B1 is not provided with any limits differing from those of the vehicle deceleration control function. As long as the vehicle deceleration control function is located within its working range, the coupling force control function is also active. The total braking performance is adjusted only via the trailer vehicle, with the disadvantage that any temperature difference that may exist between the wheel brakes of the trailer vehicle and tractor vehicle becomes even greater due to this control.

Another disadvantage of the method described in EP 0 697 314 B1 is that vehicle deceleration control does not take place in a manner adapted to individual axles. Also, adjustment or adaptation to the braking behavior of the vehicle combination is slow, and the braking process is subject to numerous control interventions due to the simultaneous vehicle deceleration control (Z-control) and coupling force control, reducing braking comfort. Additionally, there are longer dead times and thus larger deviations between actual and set performance.

EP 0 885 793 A2 of WABCO GmbH describes, for braking a vehicle, a method in which the load condition of the vehicle is determined by a load signal, which is formed from a logic signal, which is used as a logic signal linking the vehicle driver's intent and the associated braking force.

EP 0 445 575 B1 describes, for distribution of brake pressure to the axles of a vehicle having anti-lock brake system (ABS) pressurized fluid brakes, a method in which adaptive adjustment of the brake pressure distribution to the axles of the vehicle, or in other words the ratio between front axle and rear axle brake pressure, takes place on the basis of a model in which this ratio, starting from a static pressure ratio, changes linearly with the set vehicle deceleration. The static pressure ratio depends on the load condition and is not influenced by the braking forces of a trailer vehicle. The current value of brake pressure distribution at a given time is used as the basis for the subsequent braking processes until the monitored inter-axle speed difference exceeds a predetermined limit value, after which a new brake pressure distribution function is determined as a function thereof.

EP 0 357 983 B1 describes, for load-dependent control of the brake pressure of a commercial vehicle, a method whereby, in a range below the active capability of ABS, the brake pressure ratio and a reference factor are readjusted from their starting values if the wheel speed differences, for example the deceleration control difference between the axles of the vehicle, exceed predetermined limit values. The brake pressure ratio is the ratio between front axle and rear axle brake pressures of the vehicle; the reference factor determines the total braking level and is defined as the ratio of total brake pressure to set vehicle deceleration. Readjustment of the brake pressure ratio and the reference factor takes place in a self-learning procedure.

It is desired to provide a method and system whereby automatic load-dependent braking force control (load sensing function) can be applied for the trailer vehicle, so that control improvements over conventional methods for controlling brake-application energy in vehicle combinations without a trailer vehicle load sensing function can be realized. Such advantages include, in particular, rapid adaptation of the control system to the respective driving and load conditions with short dead times and high braking comfort.

SUMMARY OF THE INVENTION

Generally speaking, a method and system for controlling brake-application energy in a vehicle combination (comprising a tractor vehicle and a trailer vehicle) is provided which improves over prior art methods and systems.

In accordance with one embodiment of the present invention, a set deceleration value is determined and compared with the actual deceleration value during a braking process. This comparison yields a brake-application energy reference value "kappa" as a control variable, which represents the initial value for the vehicle deceleration control function and is an input variable for determination of brake-application energy levels for the tractor vehicle and the trailer vehicle. Set brake-application energy values for the tractor vehicle and the trailer vehicle are determined from the set deceleration value derived from actuation of the brake pedal, from a value dependent on the current brake-application energy reference value kappa, from the brake-application energy level for the tractor vehicle and from the brake-application energy level for the trailer vehicle, using sets of performance characteristics resident in the program of the EBS. These sets of performance characteristics describe the dependencies of the brake-application energy levels for the tractor vehicle and trailer vehicle on the brake-application energy reference value kappa and/or on the axle-load ratio (ALV) for the tractor vehicle.

In principle, the method according to the present invention represents a coupling force control method, since load distributions are taken into consideration.

According to a further embodiment of the present invention, the sets of performance characteristics and the brake-application energy levels for the tractor vehicle and trailer vehicle are obtained as a function of predefined influencing factors in such a way that the braking work, which depends on the ALV and on the load and which is furnished by the tractor vehicle and trailer vehicle, is distributed to the tractor vehicle or trailer vehicle in a manner corresponding to an influencing factor. By predefining the influencing factor, the braking work can be distributed as desired to the tractor vehicle or trailer vehicle by appropriate change of the brake-application energy levels for the tractor vehicle and trailer vehicle. Indeed, the distribution can be varied from a first extreme condition (influencing factor=100%), in which each of the tractor and trailer vehicles is independently braked and thus the brake-application energy level for the tractor vehicle depends on only the ALV and the brake-application energy level for the trailer vehicle depends on the ALV and on the brake-application energy reference value kappa, to a second extreme condition (influencing factor=0%), in which the brake-application energy levels for the tractor vehicle and trailer vehicle depend on only the brake-application energy reference value kappa.

In a first extreme case (influencing factor=100%), the control objective is to ensure that the wheels of the tractor vehicle and trailer vehicle adhere equally to the roadway surface, in which case the coupling force is zero. In a second extreme case (influencing factor=0%), the control objective is to achieve similar wear of the brakes of the tractor vehicle and trailer vehicle and is no longer concerned with ensuring equal adhesion.

Influencing factors having values of between 100% and 0% result in distributions of braking work to the tractor vehicle and trailer vehicle that correspond to a range from relatively large similarity of adhesion and relatively small similarity of wear to relatively small similarity of adhesion and relatively large similarity of wear.

The ALV is determined from the static pressure ratio and the wheel brake ratio. The wheel brake ratio is determined from known Q factors for the front axle and rear axle of the tractor vehicle. These factors represent the specific braking forces on the front and rear axles. They are calculated in known manner from the nominal torques of the built-in brakes and the dynamic tire radii. The ALV can also be determined in other ways, for example by means of axle-load sensors on the front and rear axles or even only on the rear axle of the tractor vehicle.

The brake-application energy level values of the tractor vehicle and of the trailer vehicle are then determined from the ALV and the brake-application energy reference value kappa. It will be appreciated that, in connection with such determination, the brake-application energy reference value and the axle-load ratio can be applied in linear or in affine relationships.

The present invention has the following advantages: (i) faster adaptation is achieved by the direct dependency of the kappa of both vehicles of the vehicle combination as well as by the pre-assignment of variables that determine the coupling force before every braking action—even before the first braking action; (ii) fewer control interventions are needed during the ongoing braking action, whereby greater braking comfort, among other results, is realized; and (iii) dead times are shorter and consequently the deviations between actual and set performance are smaller. The present invention is universally applicable.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIGS. 3a–3e depict various load conditions of a vehicle combination (including a tractor vehicle and a trailer vehicle having two axles), and show values for the ALV, axle-loads (AL), total load, load distribution, and BDN-Z and BDN-A, as well as the brake-application energy reference value (kappa), in accordance with the present invention, FIGS. 6a–6e depict different load conditions of vehicle combinations in which the trailer vehicle has two axles, under an influencing factor (E) of 100%, in accordance with the present invention, FIGS. 7a–7e depict the different load conditions of vehicle combinations in which the trailer vehicle has two axles of FIGS. 6a–6e, under an influencing factor (E) of 0%, in accordance with the present invention.

DETAILED DESCRIPTION OF THE PREFERRED EMBODIMENTS

Figure 1A:
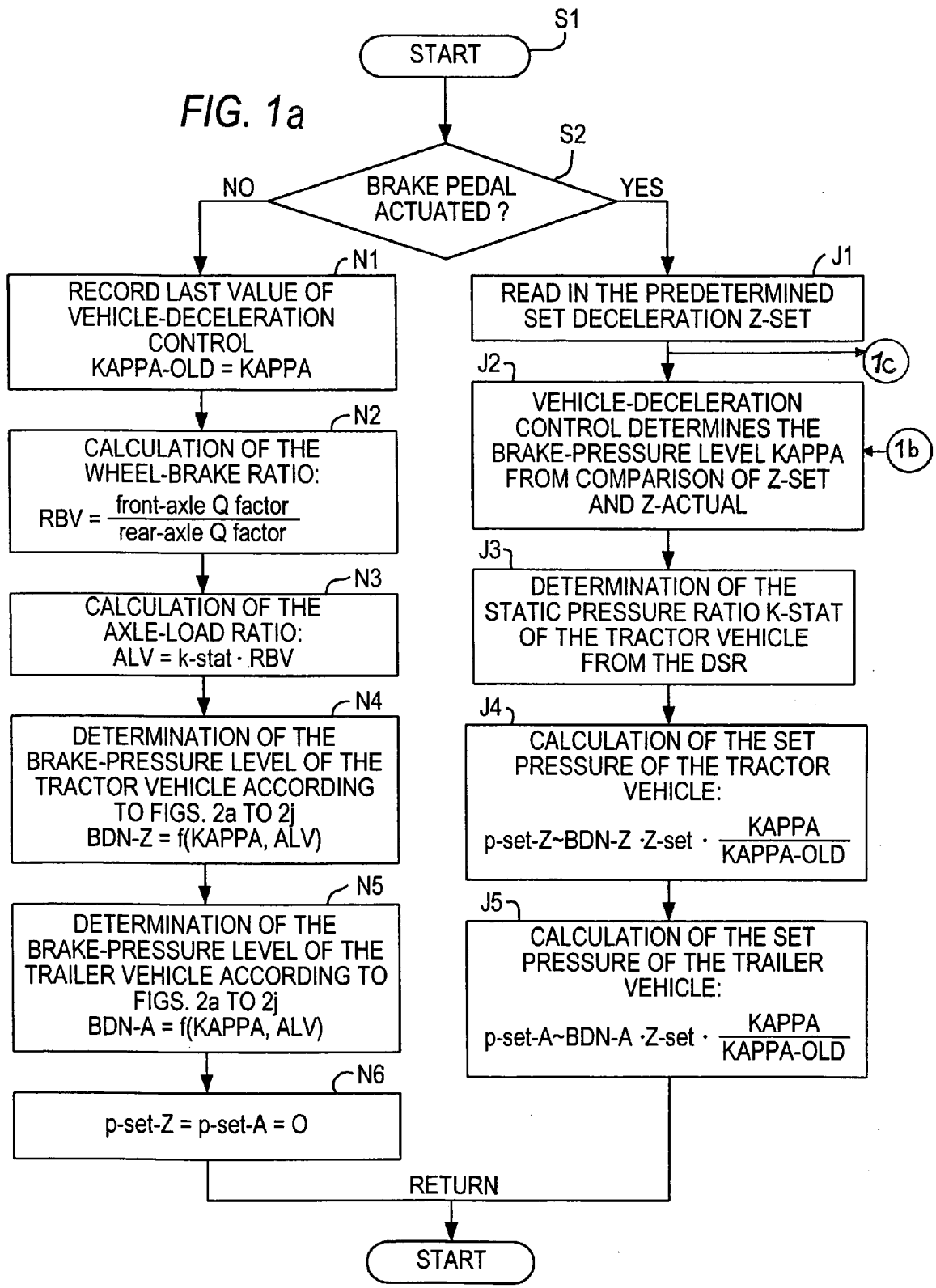
FIG. 1a–1c comprise a flow diagram showing the process flow of a method for controlling brake-application energy in a vehicle combination according to a preferred embodiment of the present invention.
Figure 1B:
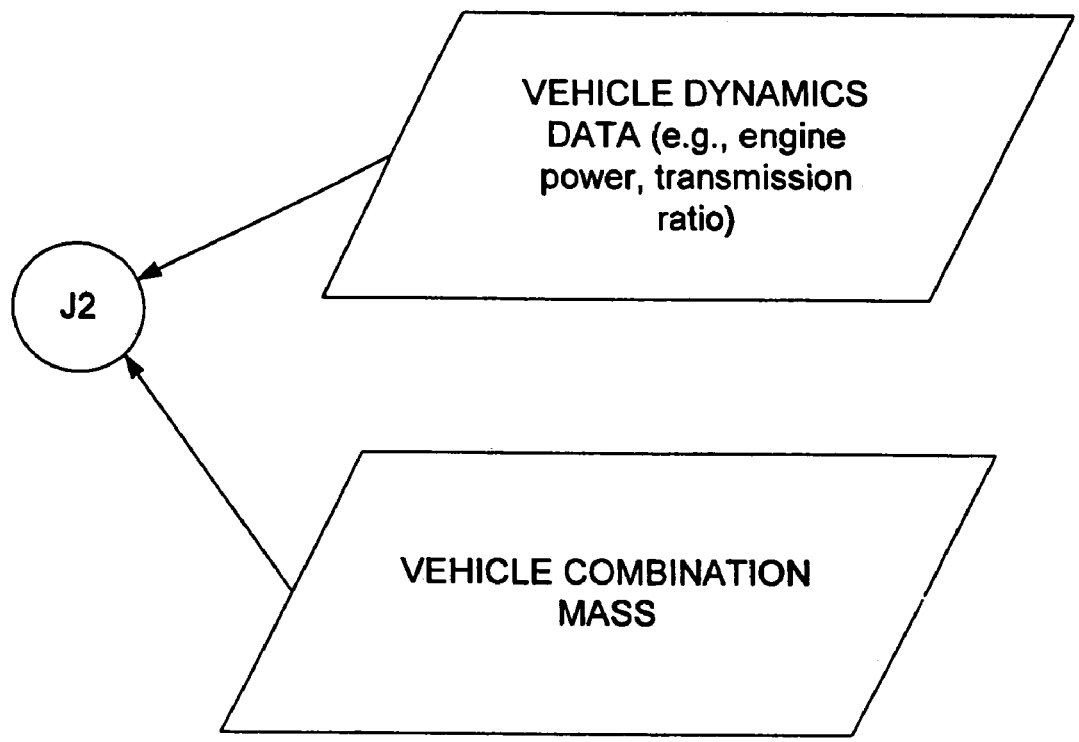

Referring now to the drawing figures, FIG. 1 depicts a process for controlling brake-application energy in a vehicle combination (which includes a tractor vehicle equipped with an EBS as well as a trailer vehicle) according to a preferred embodiment of the present invention (brake-application energy being expressed as brake pressure or pressure). After the start in step S1, a check is conducted to ascertain whether the brake pedal has been actuated or a brake value transmitter signal is being output (step S2). If this is the case, a set deceleration value $Z_{set}$ is generated from the brake value transmitter signals and read in (step J1).

In a subsequent step J2, a brake-application energy reference value (kappa) is determined. The vehicle deceleration control function determines kappa from a comparison of the set deceleration value $Z_{set}$ with actual deceleration value $Z_{actual}$. Vehicle dynamics data such as, for example, engine power and transmission ratio for the vehicle combination, as well as the mass of the vehicle combination can be data inputs on which the determination of the brake-application energy reference value is based (see FIG. 1b).

The step of determining the brake-application energy reference value can include As will be appreciated by those of ordinary skill in the art, the vehicle EBS control unit 10 (see FIG. 9) has the capability to effect such filtering.

In a subsequent step J3, a differential slip control function (DSR) of the EBS determines the static ratio k-stat between the front axle and rear axle brake-application energy (brake-application energy ratio) of the tractor vehicle. This can be accomplished by means of an algorithm such as that described in EP 0 445 575 B1, for example. Static in this case means the load situation while the vehicle is stationary.

In a subsequent step J4, the set brake-application energy value P-set-Z of the tractor vehicle is determined from the relationship:

P-set-Z~BDN-Z·$Z_{set}$·(kappa/kappa-old)

In a step J5, the set brake-application energy value P-set-A of trailer A is then determined from the relationship:

P-set-A~BDN-A·$Z_{set}$·(kappa/kappa-old)

(where BDN-Z, BDN-A, the determination of which is discussed in greater detail hereinafter, and kappa are each in bar/g). This is followed by a return to the start.

If the brake pedal has not been actuated, meaning that the brake value transmitter signals are zero, in a step N1, the last brake-application energy reference value kappa of the vehicle deceleration control function is filtered if necessary and stored as:

kappa-old=kappa

Thereafter, in a step N2, a wheel brake ratio (RBV) is determined as a quotient of a Q factor Q-VA of the front axle and of a Q factor Q-HA of the rear axle. The Q factors are already known and represent the specific braking force on the wheel or on the axle as force per unit pressure (kN/bar). The Q factors Q-VA and Q-HA of the front and rear axles VA, HA are calculated via the nominal torques M-BR of the built-in brakes in dimensions of torque per unit pressure (kNm/bar), while the dynamic tire radii r-dyn are calculated in m. Thus, $$Q = \frac{M - BR}{r - dyn}$$

In a next step N3, an ALV is determined as a product of the RBV and of the static pressure ratio k-stat.

The ALV can also be determined from signals of axle-load sensors of the tractor vehicle. If axle-load sensors are disposed on the front and rear axles of the tractor vehicle, the ALV can be determined directly from the signals thereof. However, it is also sufficient to dispose axle-load sensors only on the rear axle of the tractor vehicle, since the ALV can also be determined from the signals thereof, and since the front axle-load and the rear axle-load in a tractor vehicle, especially in the form of a truck tractor, are typically in fixed relationship to one another.

Figure 2A:
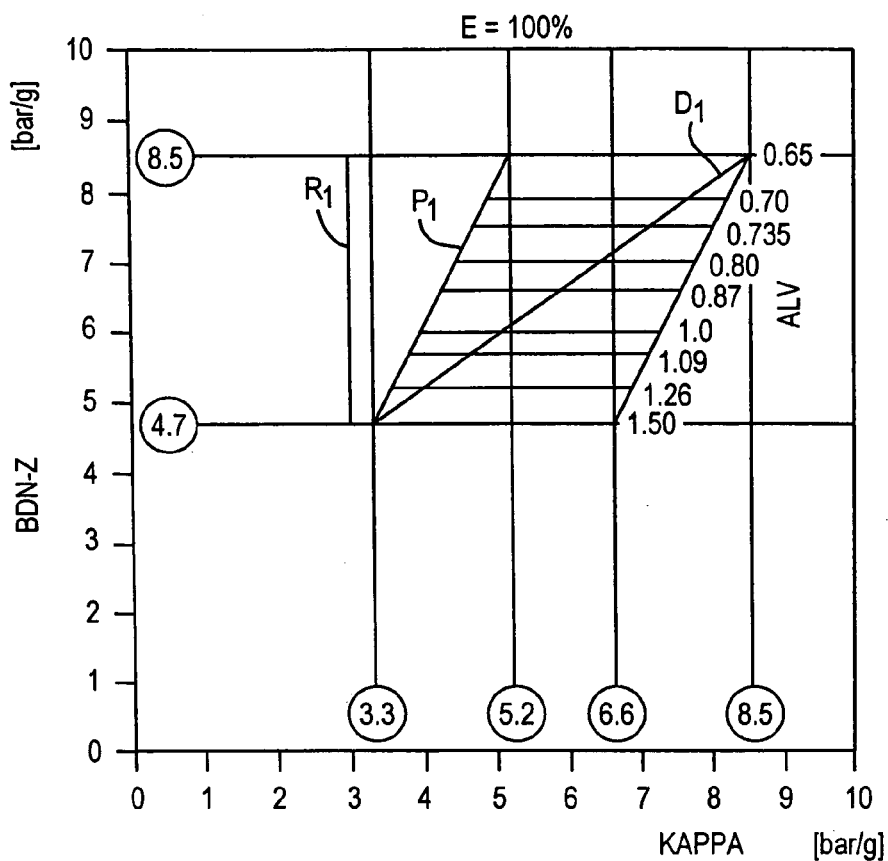
FIGS. 2a–2j are graphical representations of sets of performance characteristics which illustrate the dependency of brake-application energy levels (BDN-Z and BDN-A) for the tractor and trailer vehicles on the brake-application energy reference value (kappa) and on the ALV under different influencing factors for distributing braking work differently to the vehicle combination vehicles in accordance with the present invention.
Figure 2B:
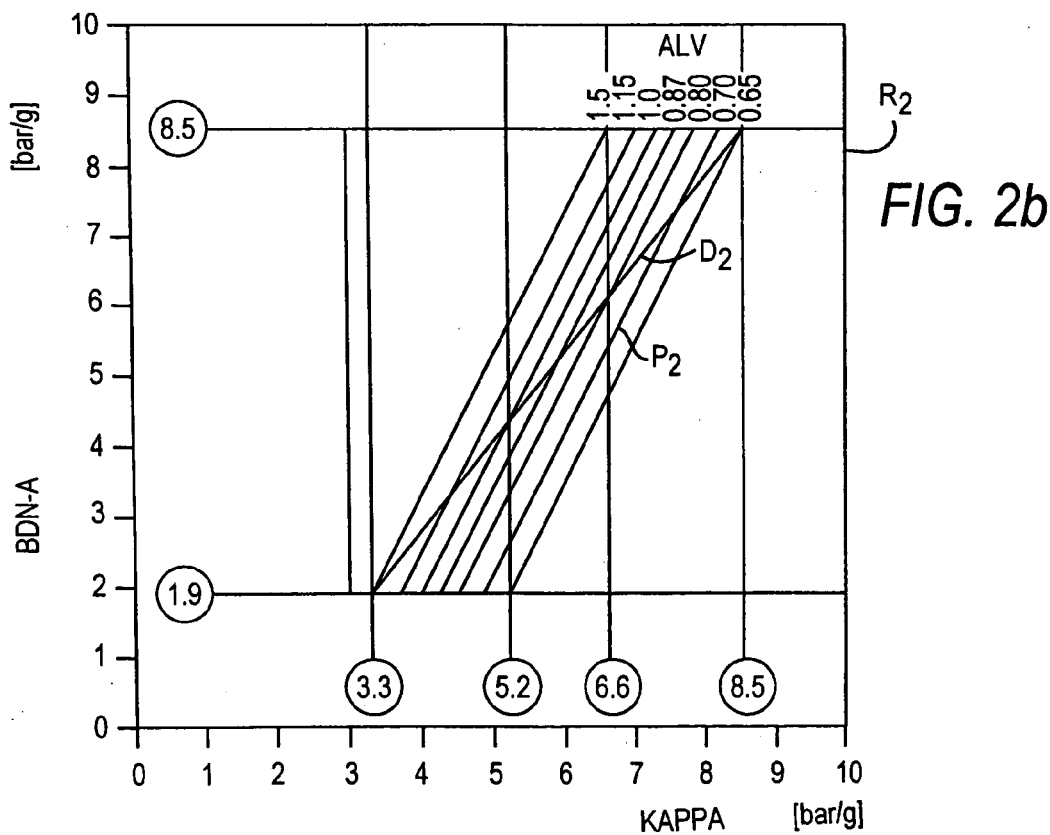
Figure 2C:
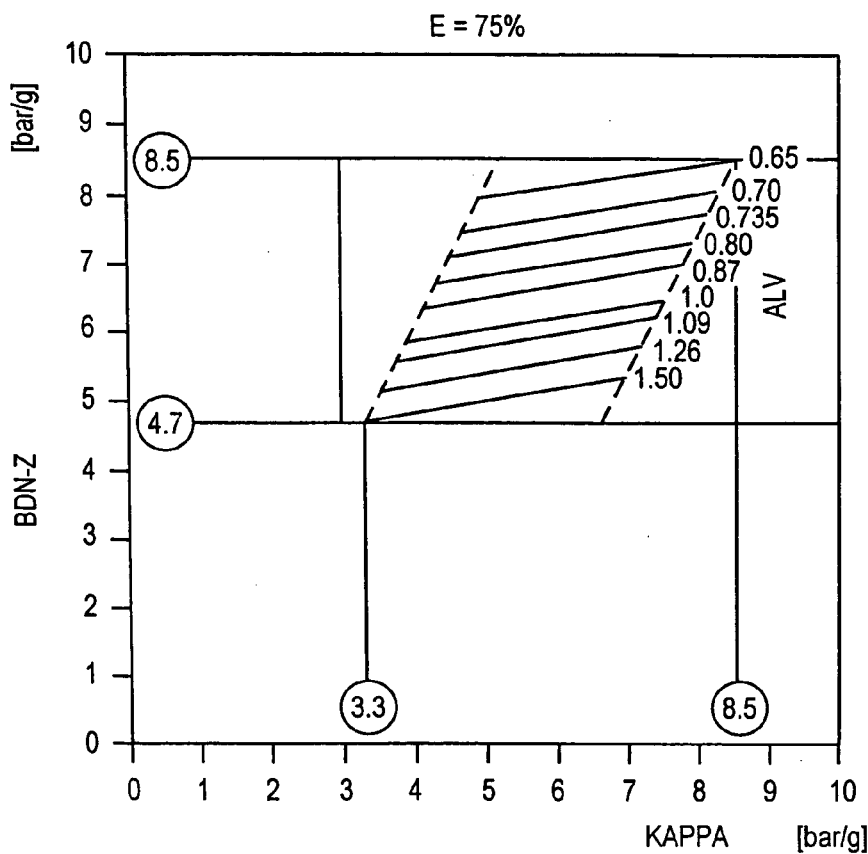
Figure 2D:
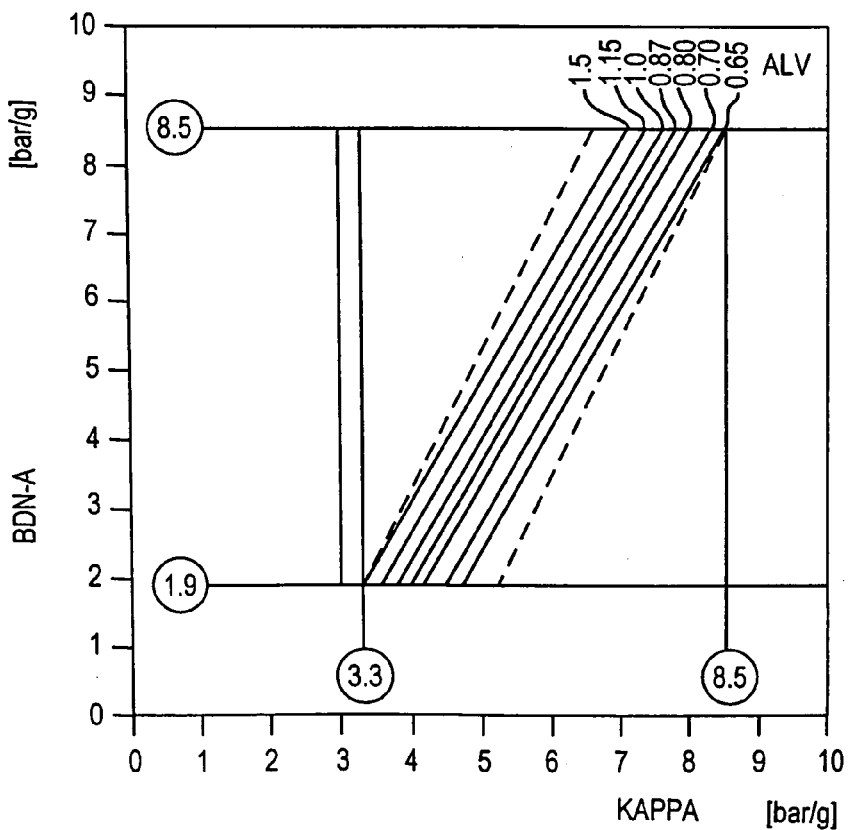

In the subsequent steps N4 and N5, the brake-application energy levels BDN-Z and BDN-A are determined by means of the sets of performance characteristics depicted in FIGS. 2a and 2b using the measured data for ALV and kappa. In an unbraked condition, the set brake-application energy values are set to zero, as shown in step N6. This is followed by a return to the start.

By way of illustration, two examples with realistic values will be discussed hereinafter. In a first case A, the entire load, as shown in FIG. 3b, for example, is located on the tractor vehicle, while in a second case B, the entire load is located on the trailer vehicle, as shown in FIG. 3d. The brake-application energy level BDN-Z for the tractor vehicle depends on only the ALV, which is plotted as a parameter in FIG. 2a. The brake-application energy level BDN-A of the trailer vehicle depends both on the ALV and on the brake-application energy reference value kappa (see FIG. 2b).

Case A :

$$kappa = \frac{22 \text{ metric tons}}{36 \text{ metric tons}} \cdot 8.5 \text{ bar/g} = 5.2 \text{ bar/g}$$

$$BDN\text{-}Z = \frac{18 \text{ metric tons}}{18 \text{ metric tons}} \cdot 8.5 \text{ bar/g} = 8.5 \text{ bar/g}$$

$$BDN\text{-}A = \frac{4 \text{ metric tons}}{18 \text{ metric tons}} \cdot 8.5 \text{ bar/g} = 1.9 \text{ bar/g}$$

Case B :

$$kappa = \frac{28 \text{ metric tons}}{36 \text{ metric tons}} \cdot 8.5 \text{ bar/g} = 6.6 \text{ bar/g}$$

$$BDN\text{-}Z = \frac{10 \text{ metric tons}}{18 \text{ metric tons}} \cdot 8.5 \text{ bar/g} = 4.7 \text{ bar/g}$$

$$BDN\text{-}A = \frac{18 \text{ metric tons}}{18 \text{ metric tons}} \cdot 8.5 \text{ bar/g} = 8.5 \text{ bar/g}$$

It should be appreciated that practically all load conditions of the vehicle combination can be considered. In particular, trailer vehicles not equipped with automatic load-dependent brake pressure control (load sensing) can be controlled in this way according to the present invention. However, the present invention also has application in trailer vehicles with load sensing. In particular, it is possible in such cases to switch between an activated and unactivated load sensing function.

FIGS. 3a through 3e show the physical relationships of various load conditions of a vehicle combination comprising a tractor vehicle as well as a trailer vehicle having two axles, together with values for the axle-loads (AL), the sums of the axle-loads for each vehicle of the vehicle combination and for the vehicle combination, the ALV of the tractor vehicle, the brake-application energy reference value kappa and the brake-application energy levels BDN-Z and BDN-A of the tractor and trailer vehicles.

Figure 4A:
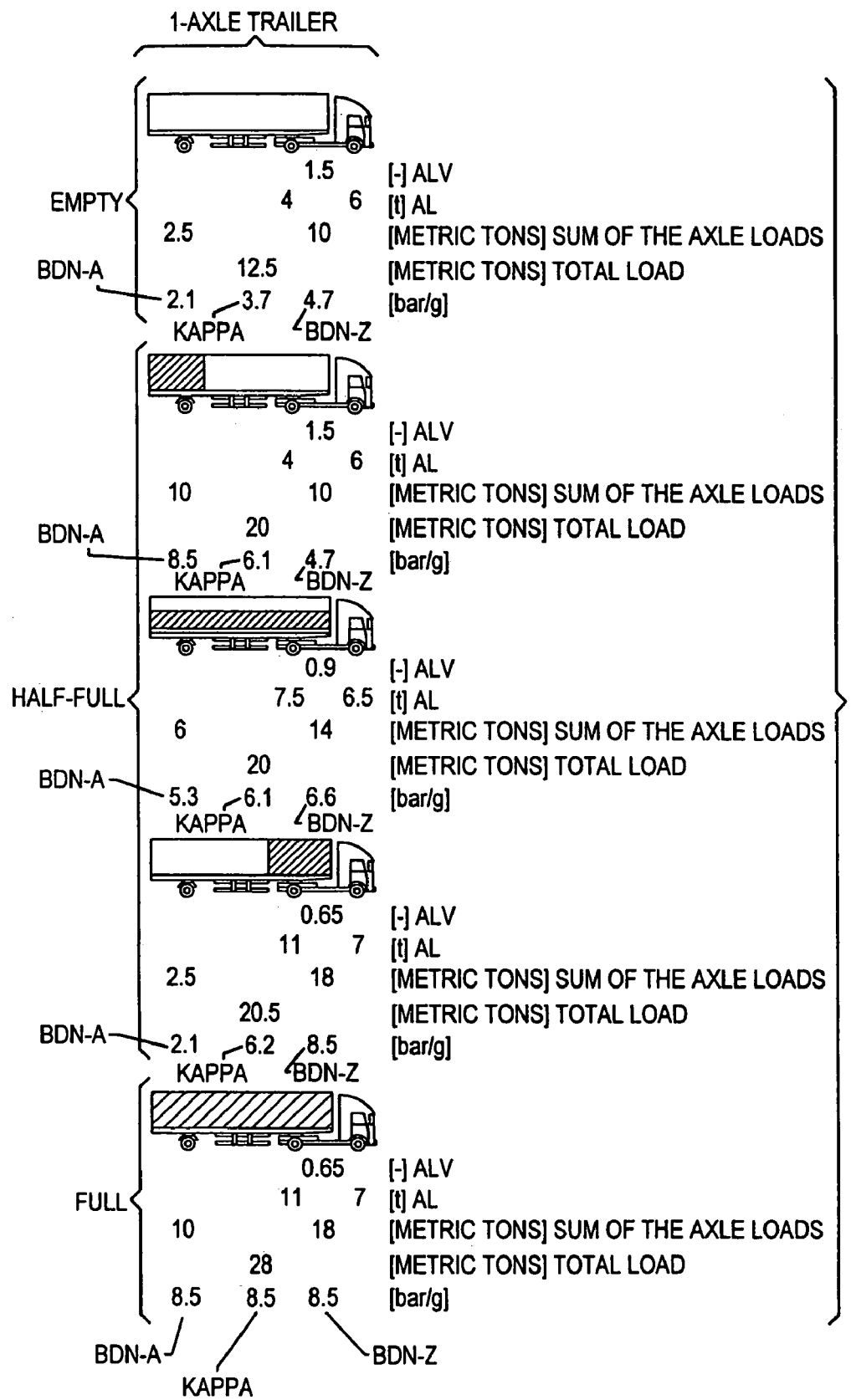
FIGS. 4a–4c depict various load conditions (including empty, half-full and full) of vehicle combinations in which the trailer vehicle has one, two and three axles, and show values for the ALV, AL, total load, load distribution, and BDN-Z and BDN-A, as well as the brake-application energy reference value (kappa), in accordance with the present invention.
Figure 4B:
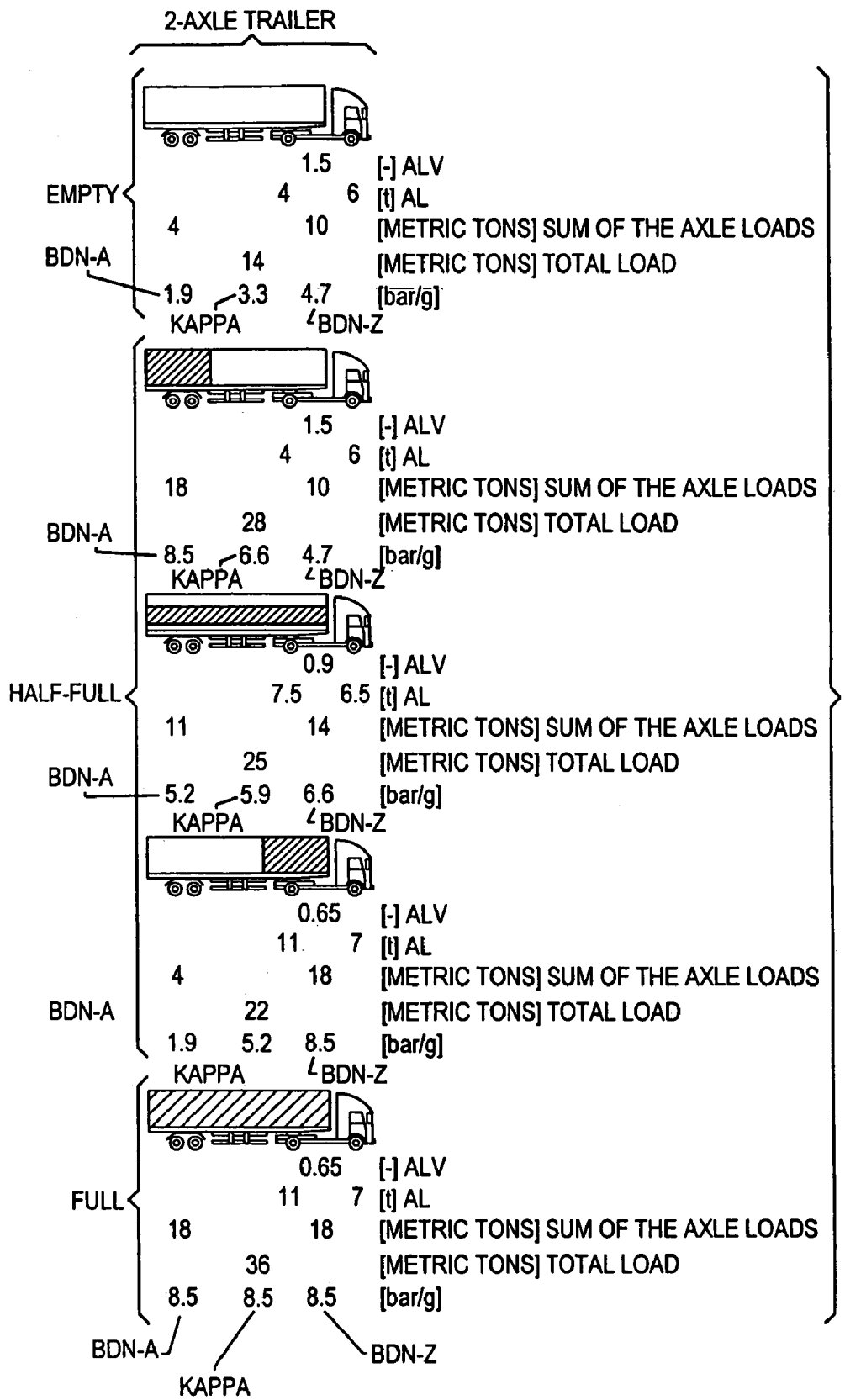
Figure 4C:
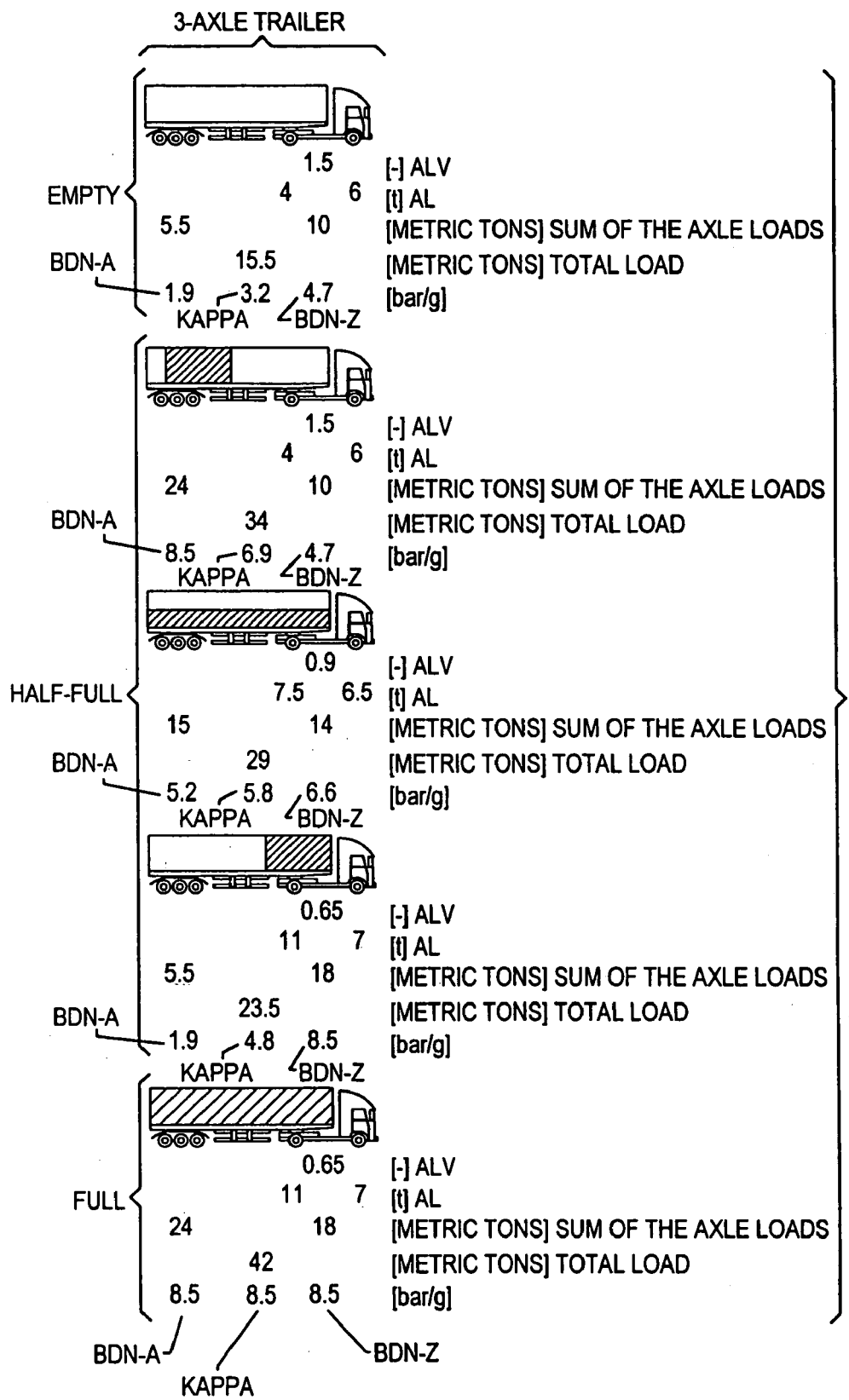

FIGS. 4a through 4c show the physical relationships of various load conditions (including empty, half-full and full) of vehicle combinations in which the trailer vehicle has one, two and three axles, and show values for the ALV, AL, total load, load distribution, and BDN-Z and BDN-A, as well as the brake-application energy reference value (kappa).

FIGS. 2a through 2j show sets of performance characteristics resident in the program of an EBS of a vehicle combination. Each set of performance characteristics comprises a family of parallel straight-line sections which are associated with different ALVs and whose end points form a parallelogram P defining the respective working range of the brake-application energy control function. The different families of parallel straight lines have different slopes, which are associated with different influencing factors (E).

Influencing factors (E) can range from a maximum value (100%) to a minimum value (0%). If the maximum value (100%) is chosen, the brake-application energy level (BDN-Z) of the tractor vehicle depends on only the ALV, and the brake-application energy level (BDN-A) of the trailer vehicle depends on the ALV and on the brake-application energy reference value (kappa) (see FIGS. 2a, 2b). In these sets of performance characteristics for the tractor vehicle, the characteristics for the different ALVs run parallel to the x-axis. When the minimum value (0%) is chosen, the brake-application energy levels (BDN-Z, BDN-A) of the tractor vehicle and trailer vehicle depend on only the brake-application energy reference value (kappa) (see FIGS. 2i, 2j).

The sets of performance characteristics of the brake-application energy levels (BDN-Z, BDN-A) for the tractor vehicle and trailer vehicle associated with the different influencing factors (E) are obtained by rotating the straight lines corresponding to the different ALVs around their points of intersection with diagonals $D_1$, $D_2$ of the parallelograms $P_1$, $P_2$ toward the diagonals. These diagonals connect the points of the brake-application energy levels for the fully loaded vehicle combination (ALV=0.65, BDN-Z=8.5 and BDN-A=8.5) and for the unloaded vehicle combination (ALV=1.5, BDN-Z=4.7 and BDN-A=1.9), or in other words the points of the predetermined limit values.

Figure 2E:
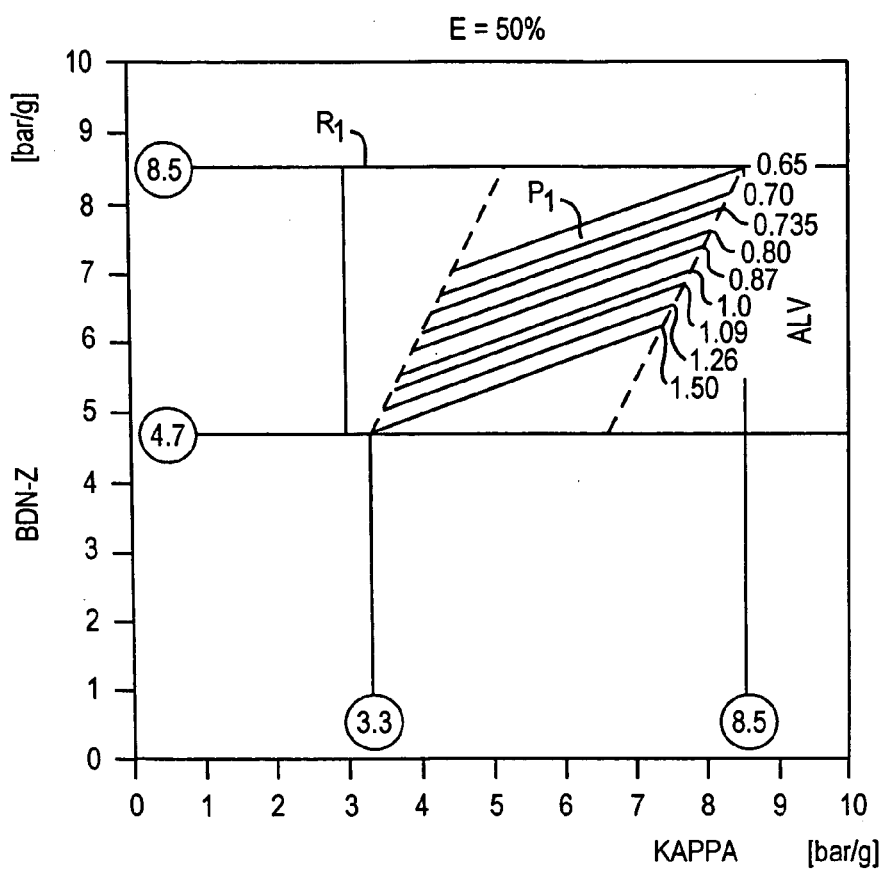
Figure 2F:
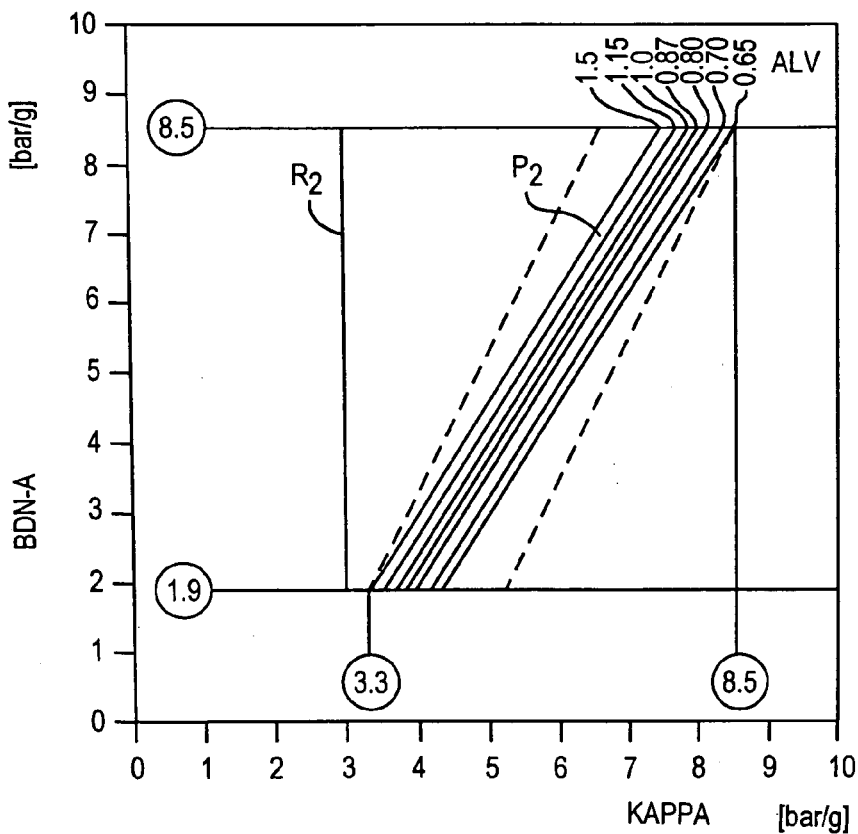
Figure 2G:
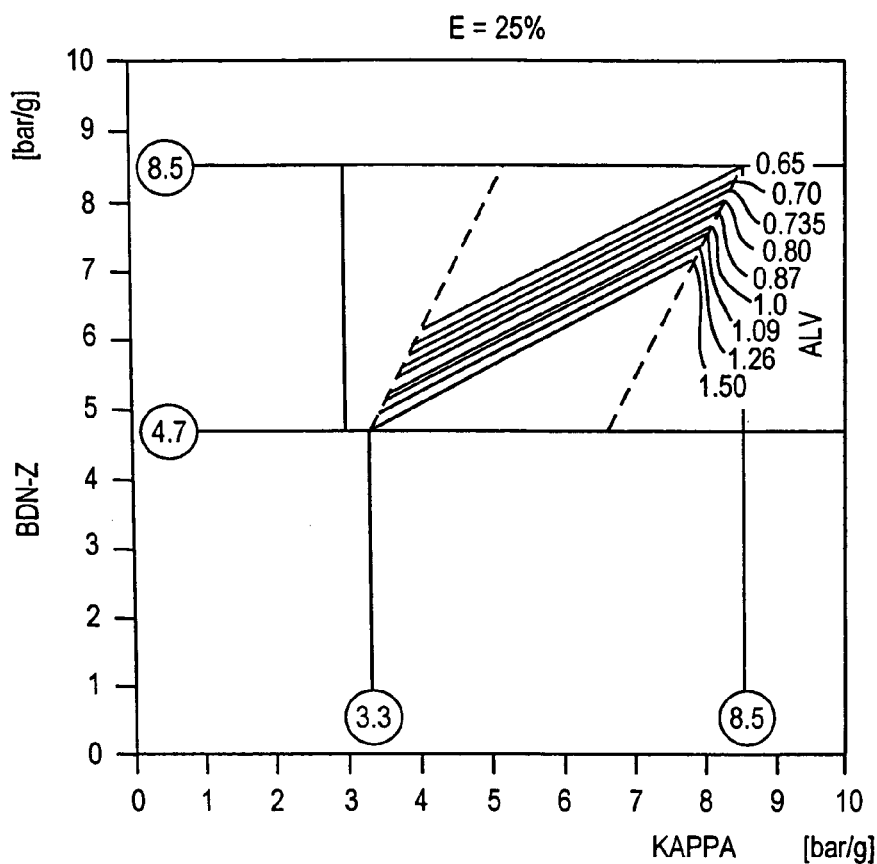
Figure 2H:
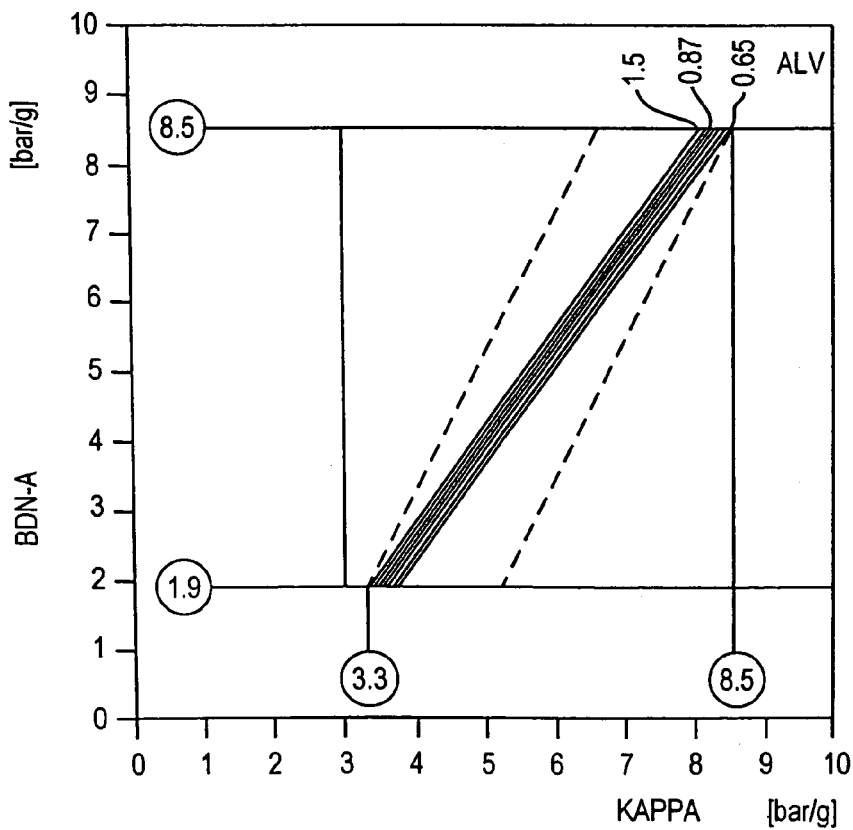
Figure 2I:
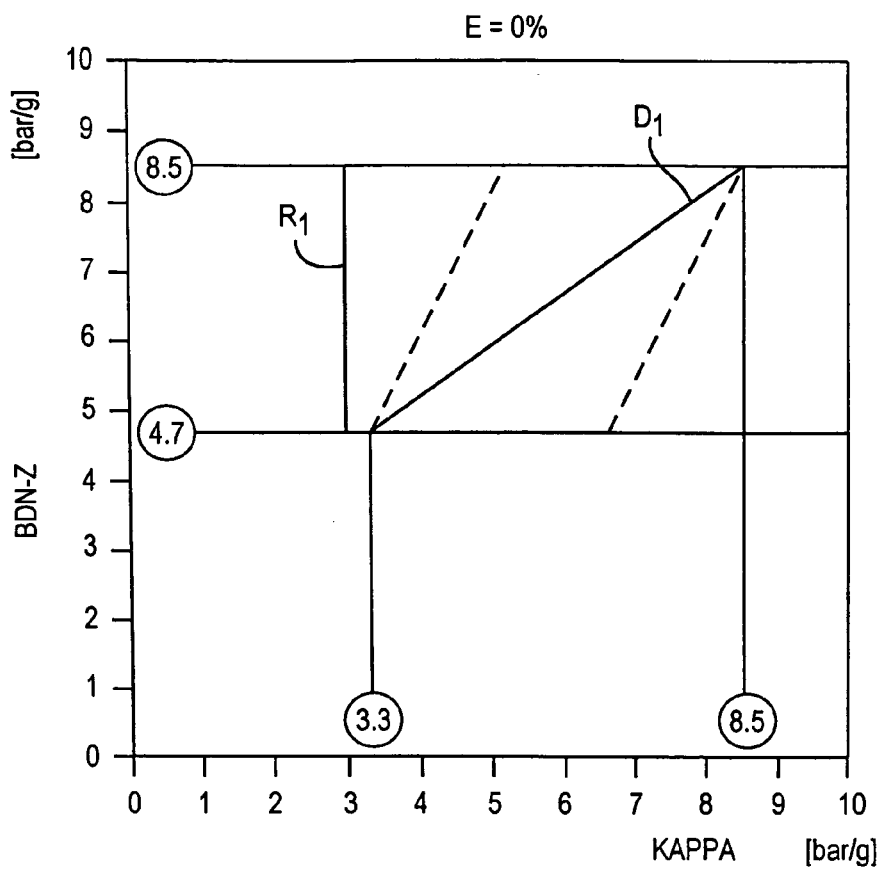

The straight lines of the family of ALVs for the brake-application energy level (BDN-Z) of the tractor vehicle can be rotated from the slope 0 (see FIG. 2a), which corresponds to characteristics associated with the maximum value (100%) of the influencing factor (E), to the slope of the diagonal $D_1$ of the parallelogram $P_1$ (see FIGS. 2a and 2i). By analogy, the straight lines of the family of ALVs for the brake-application energy level for the trailer vehicle can be rotated from the position shown in FIG. 2b, which corresponds to characteristics associated with the maximum value (100%) of the influencing factor (E), to the slope of the diagonal $D_2$ of the parallelogram $P_2$. In the latter case, all straight lines of the family of ALVs coincide on one line that is identical to the diagonal and that corresponds to the characteristic associated with the minimum value (0%) of the influencing factor (E) (see FIGS. 2b and 2j).

Figure 1C:
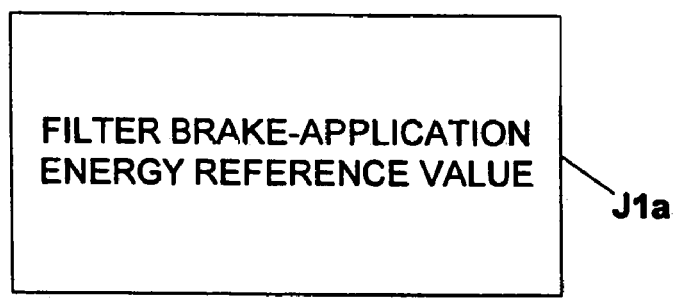

Examples of further sets of performance characteristics associated with different influencing factors are shown in FIGS. 2c through 2h, wherein the sets of performance characteristics of FIGS. 1c and 1d are associated with an influencing factor of 75%, the sets of performance characteristics of FIGS. 2e and 2f are associated with an influencing factor of 50%, and the sets of performance characteristics of FIGS. 2g and 2h are associated with an influencing factor of 25%. This will be explained in more detail hereinafter in connection with FIGS. 5 to 7.

FIGS. 5a through 5i show a vehicle combination comprising a tractor vehicle as well as a trailer vehicle having two axles under different load conditions, using three different influencing factors (100%, 50% and 0%). Three different loads—namely, load only on tractor vehicle (FIGS. 5a, d, g), load only on trailer vehicle (FIGS. 5c, f, i), and load uniformly distributed on tractor vehicle and trailer vehicle (FIGS. 5b, e, h)—are compared for each of the three different influencing factors.

The $1^{st}$ case represents maximum load only on the tractor vehicle (FIGS. 5a, d, g), namely 18 metric tons, which, assuming the trailer vehicle has an empty weight of 4 metric tons, translates to a total load of 22 metric tons. From this there is calculated an ALV of 0.65 and a brake-application energy reference value kappa of 5.2. Using an influencing factor of 100% (FIG. 5a), brake-application energy levels of 8.5 for the tractor vehicle and 1.9 for the trailer vehicle are calculated from the sets of performance characteristics of FIGS. 2a and 2b. This represents the first extreme case. Equal adhesion conditions for tractor vehicle and trailer vehicle as well as a coupling force of zero are obtained.

If an influencing factor (E) of 0% (FIG. 5g) is used, the ALV and kappa remain unchanged at first, since the load distribution is unchanged. According to the associated sets of performance characteristics of FIGS. 2i and 2j, brake-application energy levels of 6.1 for the tractor vehicle and 4.3 for the trailer vehicle are obtained for this case. This represents the second extreme case.

When an influencing factor (E) of 50% (FIG. 5d) is used, the ALV and kappa also remain unchanged at first, since the load distribution itself has not changed. From the sets of performance characteristics of FIGS. 1e and 1f, there are obtained brake-application energy levels of 7.3 for the tractor vehicle and 3.1 for the trailer vehicle.

If an influencing factor of 50% is chosen, brake-application energy values are obtained that are located exactly midway between the two extremes (100% and 0%), namely at 50%·(BDN-Z (100%)+BDN-Z (0%))=0.5·(8.5+6.1)=7.3 for the tractor vehicle and correspondingly 0.5·(1.9+4.3) =3.1 for the trailer vehicle.

In terms of effect, this means, for example, that the tractor vehicle and trailer vehicle are no longer braked directly and independently in a manner corresponding to their axle-loads, as is the case for an influencing factor of 100%. Instead, the braking work is distributed to the two vehicle of the vehicle combination in a manner corresponding to the influencing factor. The trailer vehicle takes on correspondingly more braking work and the tractor vehicle correspondingly less. Thus, the objective is no longer equal adhesion and a coupling force of zero, but is instead directed more toward similar wear, while tolerating a non-zero coupling force between the vehicles and unequal adhesion of the vehicles.

For an influencing factor of E=0%, the ratio shifts still further in the direction of more braking work by the trailer vehicle, namely from 1.9 to 4.3, and a greater approximation to similar wear of tractor vehicle and trailer vehicle is achieved. At the same time, the coupling force is non-zero and the adhesion of the two vehicles of the vehicle combination is unequal. When an influencing factor of E=0% is used, no consideration is given to the center of mass of the load; it is the actual driving situation that is assessed. The brake-application energy levels depend on only the brake-application energy reference value kappa (see also FIGS. 2i, 2j).

The $2^{nd}$ case represents load, and in fact maximum load, on only the trailer vehicle, namely 18 metric tons (FIGS. 5c, f, i), which translates to a total load of 28 metric tons of which 10 metric tons is due to the empty weight of the tractor vehicle. From this there is calculated an ALV of 1.5 and a brake-application energy reference value kappa of 6.6. Using an influencing factor of 100%, this yields a brake-application energy level of 4.7 for the tractor vehicle and of 8.5 for the trailer vehicle (see FIGS. 2a and 2b).

Figure 2J:
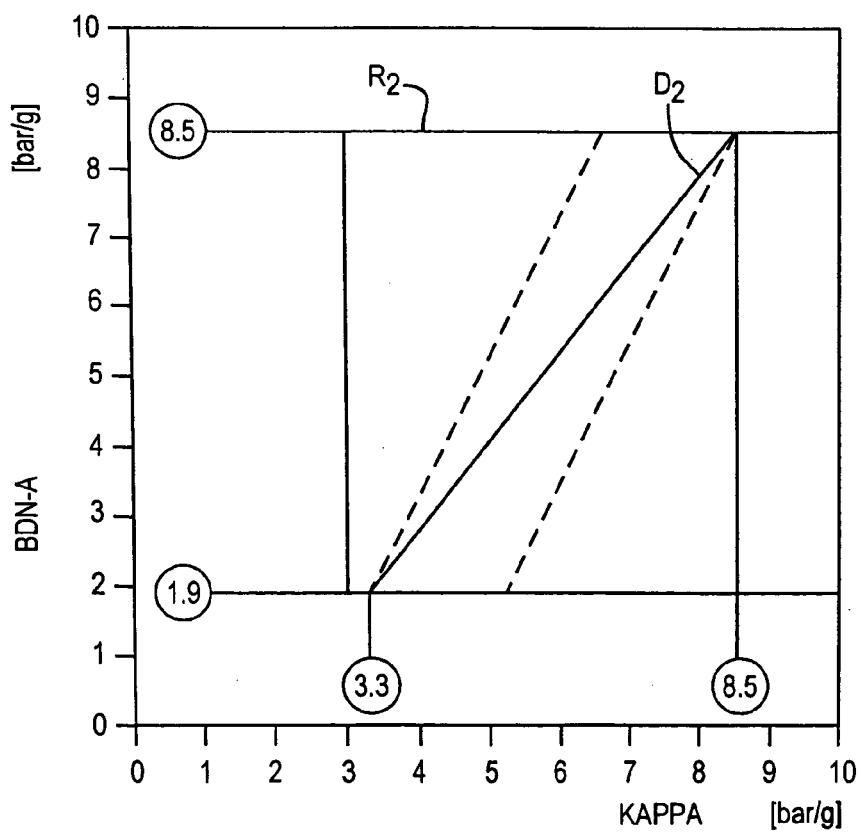

If an influencing factor E of 0% is used and the conditions are otherwise unchanged, brake-application energy levels of 7.1 for the tractor vehicle and 6.1 for the trailer vehicle are obtained (see FIGS. 2i and 2j).

If an influencing factor E of 50% is used, brake-application energy levels of 5.9 for the tractor vehicle and of 7.3 for the trailer vehicle are obtained from the sets of performance characteristics in FIGS. 2e and 2f. Once again, these values are located exactly between the values obtained by using an influencing factor of 100% and an influencing factor of 0%.

Figure 5A:
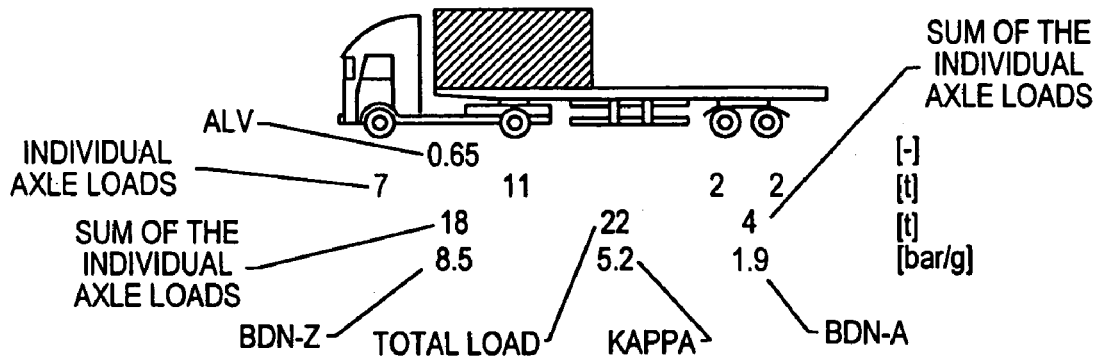
FIGS. 5a–5i depict different load conditions of vehicle combinations in which the trailer vehicle has two axles, and show values for the ALV, AL, total load, load distribution, and BDN-Z and BDN-A, as well as the brake-application energy reference value (kappa), under three different influencing factors (E) (100%, 50%, 0%), in accordance with the present invention.
Figure 5B:
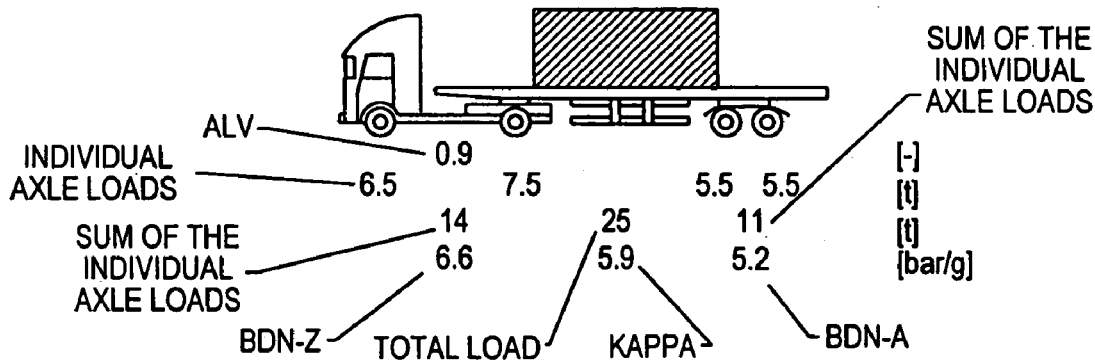
Figure 5C:
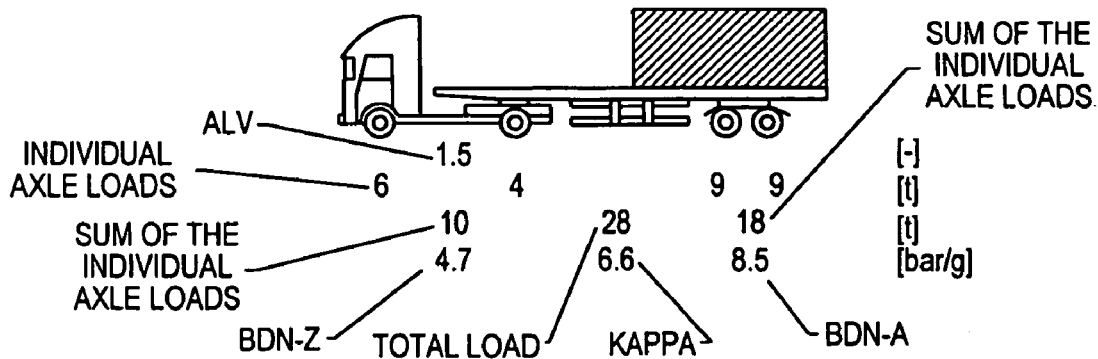
Figure 5D:
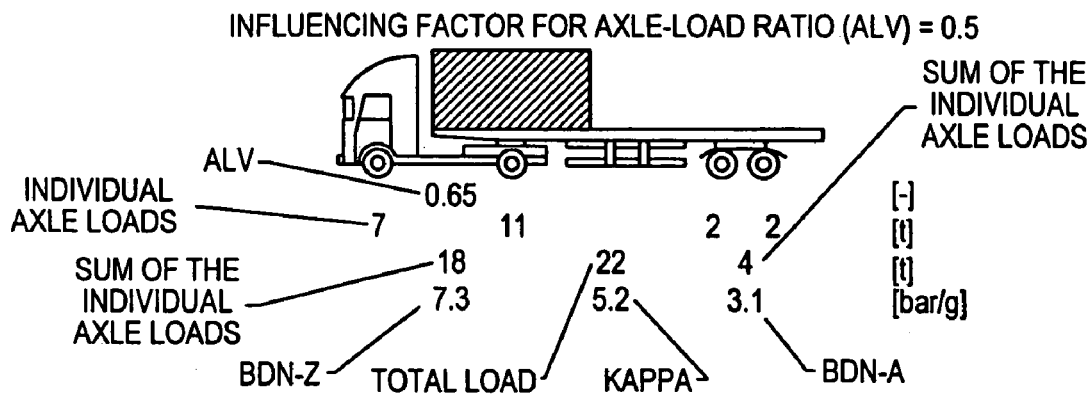
Figure 5E:
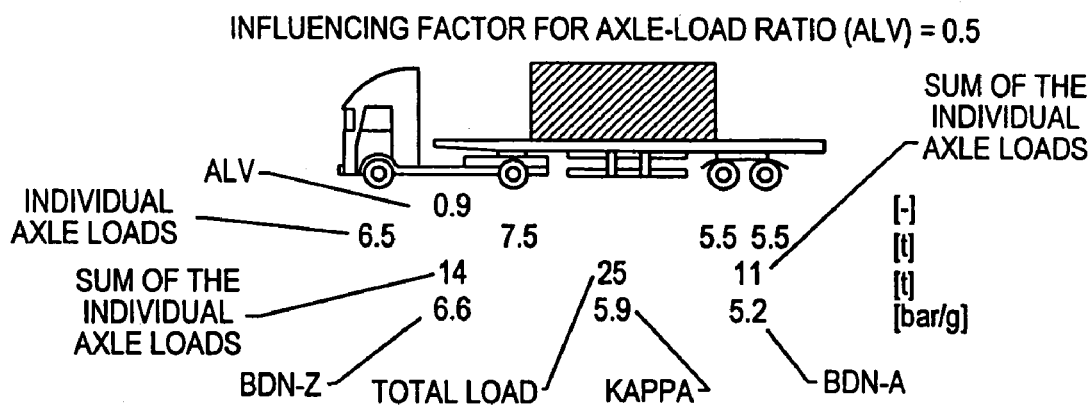
Figure 5F:
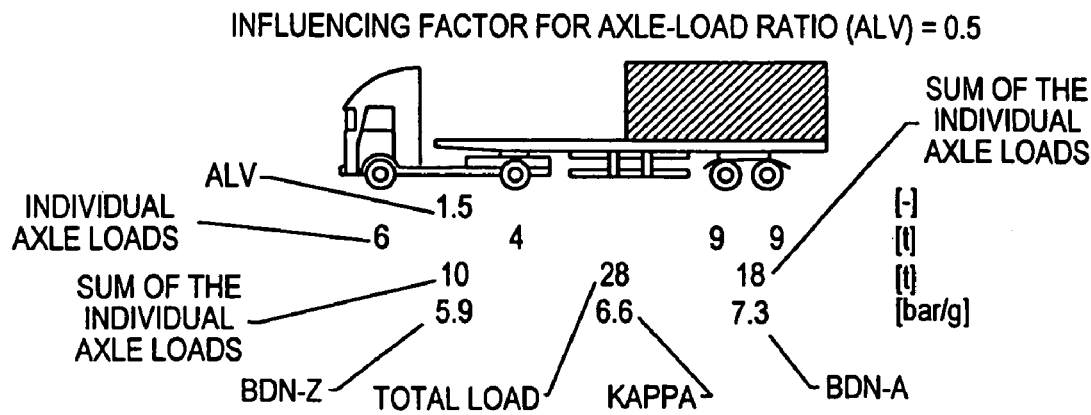
Figure 5G:
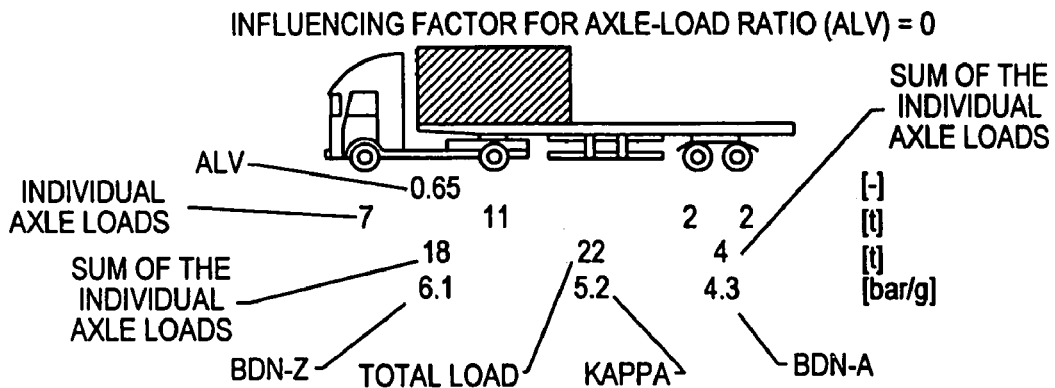
Figure 5H:
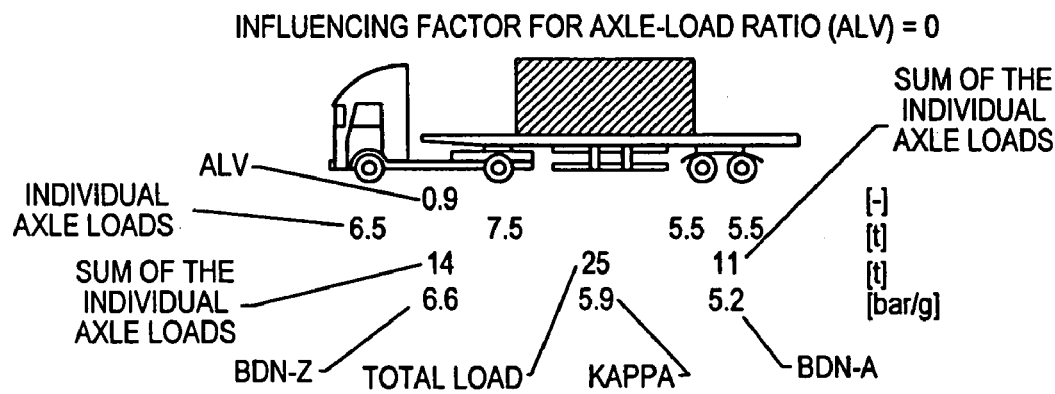
Figure 5I:
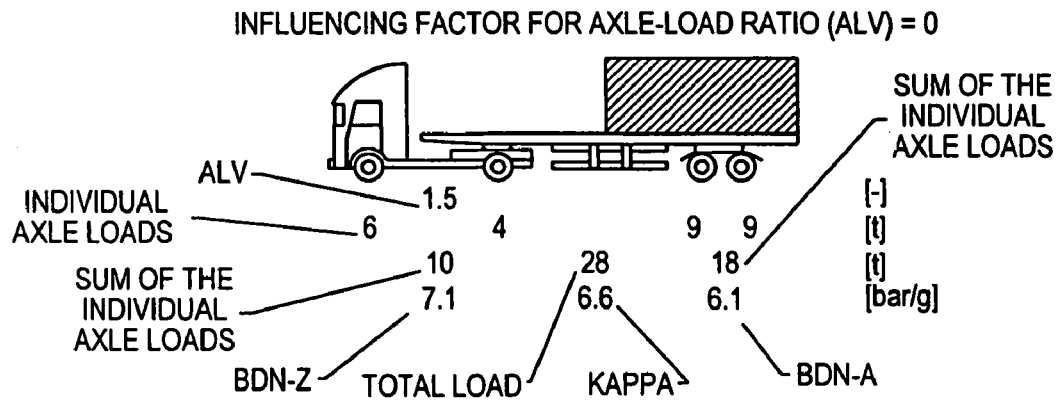
Figure 8:
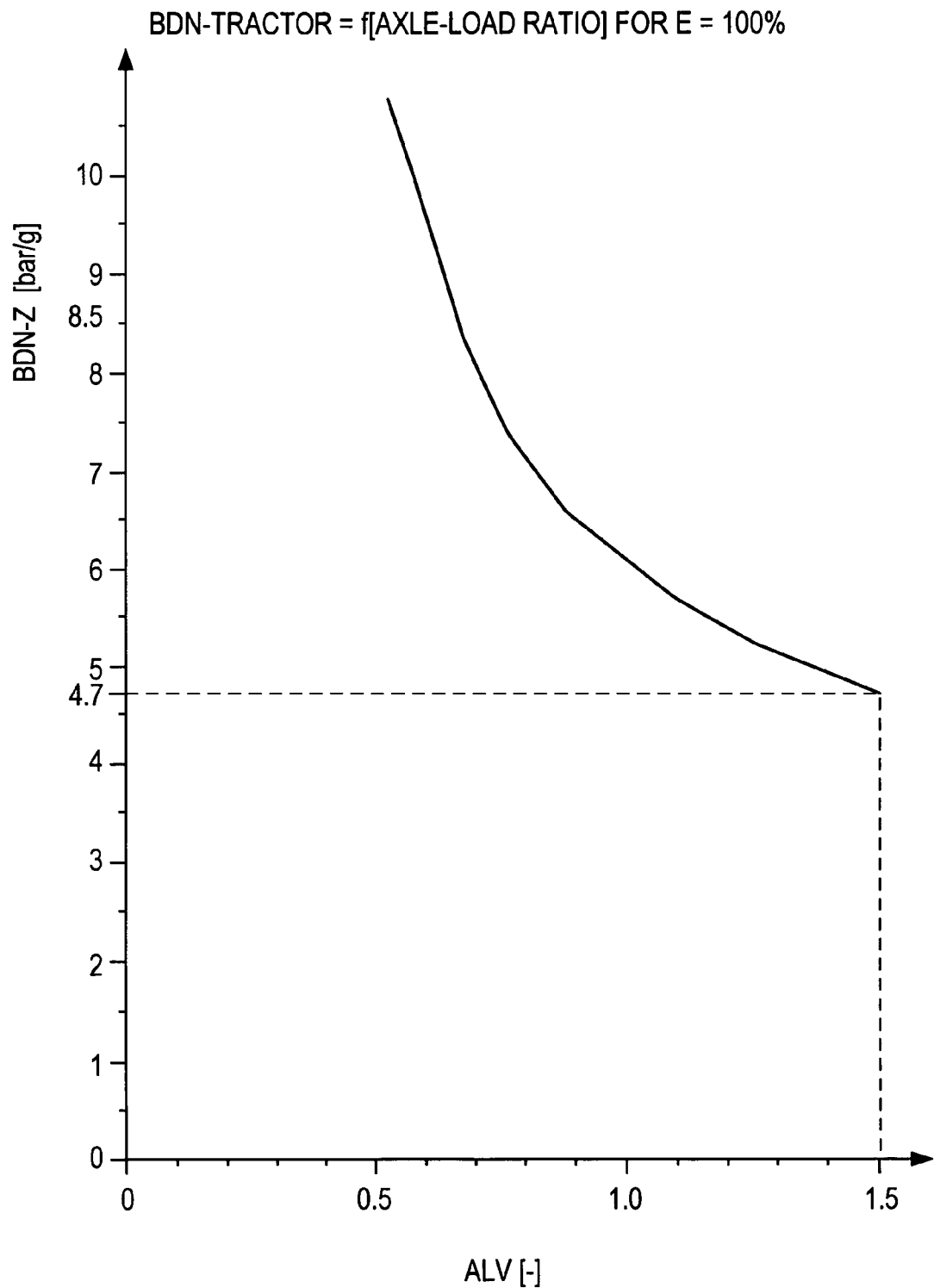
FIG. 8 is a graphical representation of the relationship between the BDN-Z of the tractor vehicle and the ALV.

The $3^{rd}$ case represents load in the middle—equally distributed to tractor vehicle and trailer vehicle (FIGS. 5b, e, h). For a total load of 25 metric tons, there is calculated an ALV of 0.9 and a brake-application energy reference value kappa of 5.9. Using these values and influencing factors of E=100%, 50% and 0%, the same brake-application energy levels for the tractor vehicle and trailer vehicle are obtained for all influencing factors from the sets of performance characteristics of FIGS. 2a, b, e, f, i, j, namely of 6.6 for the tractor vehicle and of 5.2 for the trailer vehicle.

In the sets of performance characteristics discussed herein, the ALV is used as the parameter for determination of the brake-application energy level values (BDN-Z) for the tractor vehicle and (BDN-A) for the trailer vehicle from the brake-application energy reference value kappa. Since the front axle-load and the rear axle-load of a given tractor are usually in fixed relationship relative to one another, as discussed above, the rear axle-load in this case can represent a variable equivalent to the ALV, and can also be used instead of the ALV as the parameter for the sets of performance characteristics.

FIGS. 6a through 6e show vehicle combinations comprising a tractor vehicle as well as a trailer vehicle having two axles in several load conditions, using an influencing factor of E=100%. FIGS. 6a, c, e correspond to FIGS. 5a, b, c, and so the foregoing explanation for FIGS. 5a, b, c is also applicable.

FIG. 6d shows an unloaded vehicle combination, wherein the ALV is 1.5 and the brake-application energy reference value kappa is 3.3 for the associated empty weight of 14 metric tons. From this there are calculated brake-application energy levels BDN-Z of 4.7 for the tractor vehicle and BDN-A of 1.9 for the trailer vehicle (see the sets of performance characteristics of FIGS. 2a and 2b). The brake-application energy level for the tractor vehicle is higher than the brake-application energy level for the trailer vehicle because of the greater empty weight of the tractor vehicle, which is 10 metric tons as opposed to only 4 metric tons for the trailer vehicle. The brakes of the tractor vehicle will therefore exhibit greater wear than the brakes of the trailer vehicle, because the empty mass of the tractor vehicle is already greater than the empty mass of the trailer vehicle.

FIG. 6c shows the vehicle combination with a uniform partial load in the middle, leading to an ALV of 0.9 and, for an assumed total load of 25 metric tons, a brake-application energy reference value kappa of 5.9. By using these data in the corresponding sets of performance characteristics of FIGS. 2a and 2b, brake-application energy levels of 6.6 for the tractor vehicle and 5.2 for the trailer vehicle are obtained.

FIG. 6b shows the fully loaded vehicle combination with a load of 18 metric tons on the tractor vehicle and 18 metric tons on the trailer vehicle, for a total load of 36 metric tons. From this there are obtained an ALV of 0.65 and a brake-application energy reference value kappa of 8.5. With these values there are obtained, by means of the sets of performance characteristics of FIGS. 2a and 2b, brake-application energy levels of 8.5 for the tractor vehicle and 8.5 for the trailer vehicle. These are, corresponding to the maximum load of 36 metric tons, the extreme values of the brake-application energy levels of the tractor vehicle and trailer vehicle.

FIGS. 7a through 7e show the same load conditions for a vehicle combination comprising a tractor vehicle as well as a trailer vehicle having two axles as in FIGS. 6a through 6e, except that now an influencing factor of E=0% is used. FIGS. 7a, c and e correspond to FIGS. 5g, h and i, and so the foregoing explanation for FIGS. 5g, h, i is also applicable.

FIG. 7d shows the unloaded vehicle combination; FIG. 7c shows the vehicle combination with uniform partial load; and FIG. 7e shows the fully loaded vehicle combination. On the basis of the sets of performance characteristics in FIGS. 2i and 2j, brake-application energy levels of BDN-Z=4.7 and BDN-A=1.9 for the empty vehicle, of BDN-Z=6.6 and BDN-A=5.2 for the load according to FIG. 7c, and of BDN-Z=BDN-A=8.5 for the fully loaded vehicle are obtained for the tractor vehicle and trailer vehicle, respectively, as is evident in the drawing, and the ALVs have no influence in this case.

By analogy, brake-application energy levels for all desired influencing factors (E) between the extreme values of 100% and 0% can be calculated from the relationships:

$$BDN\text{-}Z\ (x\%) = (x\%) \cdot [BDN\text{-}Z\ (100\%) + BDN\text{-}Z\ (0\%)]$$
and
$$BDN\text{-}A\ (x\%) = (x\%) \cdot [BDN\text{-}A\ (100\%) + BDN\text{-}A\ (0\%)]$$

For all other influencing factors, coupling force control exists in principle—albeit not with the objective of equal adhesion of the vehicles of the vehicle combination together with a coupling force of zero, as is true for E=100%. Under these conditions, the tractor vehicle would be underbraked if the load were disposed only on the tractor vehicle. As an example, the brake-application energy level for the tractor vehicle would normally be 8.5 if only the tractor vehicle supported the full load; if an influencing factor of smaller than 100% is used, however, the brake-application energy level is less than 8.5 bar/g. The smaller braking work then assigned to the tractor vehicle by means of the influencing factor is compensated for by the trailer vehicle, which is required to furnish correspondingly greater braking work.

If an influencing factor of 0% is used, steps N2 and N3 can be skipped in the inventive method according to FIG. 1.

As discussed above, the condition of coupling force equal to zero together with equal adhesion, which is normally a central control objective, is achieved only by the influencing factor of 100%, although the uneven load distribution results in unequal wear of the tractor vehicle and trailer vehicle. Such control of brake-application energy is based on the assumption that the brakes of the tractor vehicle and of the trailer vehicle furnish exactly the braking work corresponding to the calculated values. It should be appreciated that such an ideal case is not encountered in practice, because disturbing variables, such as temperature-dependent variations of coefficients of friction, oily brakes, overloading of the vehicle combination or a vehicle thereof, etc. —ultimately, even a change of load distribution also represents a disturbing variable—are always present. In practice, therefore, the preferred objective is similar wear, while tolerating non-zero coupling force and different adhesion, and so an influencing factor of smaller than 100% is chosen in order to distribute the influences of disturbing variables to both vehicles of the vehicle combination in a manner corresponding to the influencing factor.

For example, in the case that only the trailer vehicle is loaded and the trailer vehicle brakes become too hot, the danger exists that the braking power of the trailer vehicle will be undesirably reduced, whereby the control function will inject more brake-application energy. In turn, the hot brakes will become even hotter, and so the temperature and injected brake-application energy continue to rise through this reciprocal interaction. Thus, in the case of disturbing variables such as overheated brakes of a vehicle of the vehicle combination, accompanied by brake-application energy control with an influencing factor of 100%, the danger exists of undesired impairment or even failure of braking power, due to the fact that the disturbing variable causes the braking power of the vehicle combination vehicle in question to drop and more brake-application energy to be injected in order to compensate for the drop. As a consequence, the temperature is further increased and ultimately the brake-application energy and temperature rise higher and higher.

This danger can be greatly reduced by choosing an influencing factor smaller than 100%, such as 50%. Part of the braking work is then transferred to the other vehicle of the vehicle combination and, by virtue of the lower brake-application energy and thus smaller braking work, the brakes of the vehicle combination vehicle in question do not become as hot, thus creating a margin for compensation up to injection of the maximum brake-application energy level of 8.5 bar/g.

Accordingly, the present invention provides a method and system whereby automatic load-dependent braking force control (load sensing function) can be applied for the trailer vehicle, so that control improvements over conventional methods for control of brake-application energy of vehicle combinations without trailer vehicle load sensing function can be realized, in particular, rapid adaptation of the control system to the respective driving and load conditions can be achieved with short dead times and high braking comfort.

It will thus be seen that the objects set forth above, among those made apparent from the preceding description, are efficiently attained, and since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Figure 9:
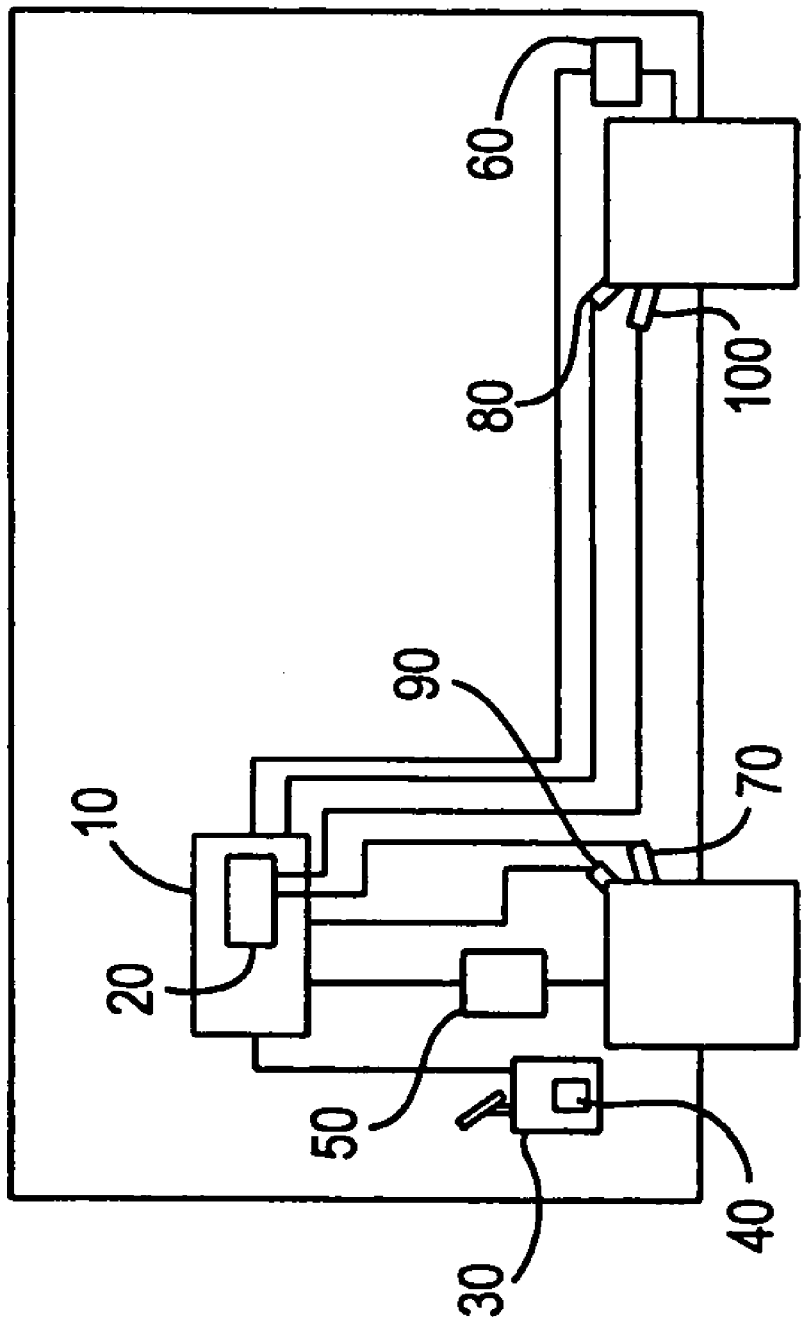
FIG. 9 is a simplified, partial schematic diagram of a conventional tractor-trailer vehicle combination equipped with an EBS and including an BBS control unit and means for determining actual deceleration, a brake pedal (including a signal transmitter for desired brake values), brake actuators (front and rear axle), wheel speed sensors and axle load sensors.

FIG. 9 is a simplified schematic diagram depicting a conventional tractor-trailer vehicle combination (partial view) equipped with an EBS and including an BBS control unit 10 and means for determining actual deceleration 20, a brake pedal 30, including a signal transmitter for desired brake values 40, brake actuators 50, 60 for the front and rear axles, respectively, wheel speed sensors 70, 80 and axle load sensors 90, 100.

What is claimed is:

1. A method for controlling brake-application energy in a vehicle combination including a tractor vehicle equipped with an electronic braking system and a trailer vehicle, the tractor vehicle having at least one front axle and at least one rear axle, the trailer vehicle having at least one trailer axle, the method comprising the steps of:
   determining, during braking of said vehicle combination, a set deceleration value,
   measuring, during braking of said vehicle combination, an actual deceleration value,
   comparing said set deceleration value with said actual deceleration value,
   determining a brake-application energy reference value from the comparison of said set deceleration value with said actual deceleration value,
   determining a brake-application energy level for said tractor vehicle and a brake-application energy level for said trailer vehicle,
   determining an axle-load ratio for said tractor vehicle,
   providing sets of performance characteristics in said electronic braking system representing the dependencies of said brake-application energy level for said tractor vehicle and said brake-application energy level for said trailer vehicle on at least one of said brake-application energy reference value and said axle-load ratio,
   calculating a set brake-application energy value for said tractor vehicle based on (i) said set deceleration value, (ii) a value that is a function of said brake-application energy reference value, and (iii) said brake-application energy level for said tractor vehicle, in accordance with said sets of performance characteristics, and
   calculating a set brake-application energy value for said trailer vehicle based on (i) said set deceleration value, (ii) said value that is a function of said brake-application energy reference value, and (iii) said brake-application energy level for said trailer vehicle, in accordance with said sets of performance characteristics.

2. The method according to claim 1, further comprising the step of distributing brake-application energy to said tractor vehicle and said trailer vehicle based on said set brake-application energy value for said tractor vehicle and said set brake-application energy value for said trailer vehicle.

3. The method according to claim 2, wherein said sets of performance characteristics, said brake-application energy level for said tractor vehicle and said brake-application energy level for said trailer vehicle are associated with predetermined influencing factors, and wherein said step of distributing brake-application energy is effected in a manner associated with a selected one of said influencing factors.

4. The method according to claim 3, wherein said predetermined influencing factors range from a minimum value of 0 percent to a maximum value of 100 percent.

5. The method according to claim 4, wherein, when said selected one of said influencing factors is said maximum value, said brake-application energy level for said tractor vehicle is based on only said axle-load ratio and said brake-application energy level for said trailer vehicle is based on said axle-load ratio and on said brake-application energy reference value.

6. The method according to claim 4, wherein, when said selected one of said influencing factors is said minimum value, said brake-application energy level for said tractor vehicle and said brake-application energy level for said trailer vehicle are based on only said brake-application energy reference value.

7. The method according to claim 3, wherein each set of said sets of performance characteristics is graphically representable by a grouping of parallel straight lines associated with different ones of said axle-load ratio, end points of said lines forming a parallelogram defining a working range of brake-application energy control, different ones of said groupings of parallel straight lines having different slopes associated with different ones of said influencing factors.

8. The method according to claim 7, wherein said sets of performance characteristics are obtained by rotating lines corresponding to different ones of said axle-load ratio around points of intersection of said lines corresponding to different ones of said axle-load ratio with a diagonal of said parallelogram, said lines corresponding to different ones of said axle-load ratio being rotatable from a zero slope associated with said maximum value of said influencing factors to a slope of said diagonal of said parallelogram associated with said minimum value of said influencing factors.

9. The method according to claim 1, wherein, using said sets of performance characteristics, said brake-application energy level for said tractor vehicle and said brake-application energy level for said trailer vehicle are determined from said brake-application energy reference value during braking of said vehicle combination.

10. The method according to claim 1, further comprising the step of storing said brake-application energy reference value as a non-current brake-application energy reference value after a braking of said vehicle combination.

11. The method according to claim 10, wherein said value that is a function of said brake-application energy reference value is the quotient obtained by dividing said brake-application energy reference value by said stored non-current brake-application energy reference value.

12. The method according to claim 11, wherein said set brake-application energy value for said tractor vehicle is the product obtained by multiplying said set deceleration value by said brake-application energy level for said tractor vehicle and by said value that is a function of said brake-application energy reference value.

13. The method according to claim 11, wherein said set brake-application energy value for said trailer vehicle is the product obtained by multiplying said set deceleration value by said brake-application energy level for said trailer vehicle and by said value that is a function of said brake-application energy reference value.

14. The method according to claim 1, further comprising the steps of measuring a wheel brake ratio and a static pressure ratio, and wherein said axle-load ratio is the product obtained by multiplying said wheel brake ratio and said static pressure ratio.

15. The method according to claim 14, further comprising the steps of measuring a braking force value for said at least one front axle of said tractor vehicle and a braking force value for said at least one rear axle of said tractor vehicle, and wherein said wheel brake ratio when said vehicle combination is in an unbraked condition is the quotient obtained by dividing said braking force value for said at least one front axle by said braking force value for said at least one rear axle.

16. The method according to claim 14, wherein said static pressure ratio is determined from a differential slip control function of said electronic braking system.

17. The method according to claim 1, wherein said at least one front axle of said tractor vehicle and said at least one rear axle of said tractor vehicle include axle-load sensors, and wherein said axle-load ratio is determined based on signals of said axle-load sensors.

18. The method according to claim 1, wherein said at least one rear axle of said tractor vehicle has at least one axle-load sensor, and said axle-load ratio is determined based on signals of said at least one axle-load sensor.

19. The method according to claim 1, wherein, using said sets of performance characteristics, said brake-application energy level for said tractor vehicle is determined as a function of at least one of said axle-load ratio and said brake-application energy reference value, and said brake-application energy level for said trailer vehicle is determined as a function of one of (i) said brake-application energy reference value and (ii) said brake-application energy reference value and said axle-load ratio.

20. The method according to claim 1, wherein said step of determining said brake-application energy level value for said tractor vehicle and said brake-application energy level value for said trailer vehicle is based on said brake-application energy reference value and said axle-load ratio, said brake-application energy reference value and said axle-load ratio being applied in at least one of linear and affine equations.

21. The method according to claim 1, wherein said set brake-application energy value for said tractor vehicle and said set brake-application energy value for said trailer vehicle are set to zero when said vehicle combination is in an unbraked condition.

22. The method according to claim 1, wherein said step of determining said brake-application energy reference value is based on vehicle dynamics data and the mass of said vehicle combination.

23. The method according to claim 22, wherein said vehicle dynamics data include at least one of engine power and transmission ratio of said vehicle combination.

24. The method according to claim 1, wherein said step of determining said brake-application energy reference value includes filtering said brake-application energy reference value.

25. A method for controlling brake-application energy in a vehicle combination including a tractor vehicle equipped with an electronic braking system and a trailer vehicle, the tractor vehicle having at least one front axle and at least one rear axle, the trailer vehicle having at least one trailer axle, the method comprising the steps of:
determining, during braking of said vehicle combination, a set deceleration value,
measuring, during braking of said vehicle combination, an actual deceleration value,
comparing said set deceleration value with said actual deceleration value,
determining a brake-application energy reference value from the comparison of said set deceleration value with said actual deceleration value,
determining a brake-application energy level for said tractor vehicle and a brake-application energy level for said trailer vehicle, determining an axle-load for said at least one rear axle of said tractor vehicle, providing sets of performance characteristics in said electronic braking system representing the dependencies of said brake-application energy level for said tractor vehicle and said brake-application energy level for said trailer vehicle on at least one of said brake-application energy reference value and said axle-load of said tractor vehicle, calculating a set brake-application energy value for said tractor vehicle based on (i) said set deceleration value, (ii) a value that is a function of said brake-application energy reference value, and (iii) said brake-application energy level for said tractor vehicle, in accordance with said sets of performance characteristics, and calculating a set brake-application energy value for said trailer vehicle based on (i) said set deceleration value, (ii) said value that is a function of said brake-application energy reference value, and (iii) said brake-application energy level for said trailer vehicle, in accordance with said sets of performance characteristics.

26. The method according to claim 25, further comprising the step of distributing brake-application energy to said tractor vehicle and said trailer vehicle based on said set brake-application energy value for said tractor vehicle and said set brake-application energy value for said trailer vehicle.

27. The method according to claim 25, wherein said step of determining said brake-application energy level value for said tractor vehicle and said brake-application energy level value for said trailer vehicle is based on said brake-application energy reference value and said axle-load of said tractor vehicle, said brake-application energy reference value and said axle-load of said tractor vehicle being applied in at least one of linear and affine equations.

28. A system for controlling brake-application energy in a vehicle combination including a tractor vehicle equipped with an electronic braking system and a trailer vehicle, the tractor vehicle having front and rear axles, the trailer vehicle having at least one trailer axle, the system comprising:

means for determining, during braking of said vehicle combination, a set deceleration value, means for measuring, during braking of said vehicle combination, an actual deceleration value, means for comparing said set deceleration value with said actual deceleration value, means for determining a brake-application energy reference value from the comparison of said set deceleration value with said actual deceleration value, means for determining a brake-application energy level for said tractor vehicle and a brake-application energy level for said trailer vehicle, means for determining an axle-load ratio for said tractor vehicle, means for generating sets of performance characteristics in said electronic braking system representing the dependencies of said brake-application energy level for said tractor vehicle and said brake-application energy level for said trailer vehicle on at least one of said brake-application energy reference value and said axle-load ratio, means for calculating a set brake-application energy value for said tractor vehicle based on (i) said set deceleration value, (ii) a value that is a function of said brake-application energy reference value, and (iii) said brake-application energy level for said tractor vehicle, in accordance with said sets of performance characteristics, means for calculating a set brake-application energy value for said trailer vehicle based on (i) said set deceleration value, (ii) said value that is a function of said brake-application energy reference value, and (iii) said brake-application energy level for said trailer vehicle, in accordance with said sets of performance characteristics, and means for distributing brake-application energy to said tractor vehicle and said trailer vehicle based on said set brake-application energy value for said tractor vehicle and said set brake-application energy value for said trailer vehicle.

29. A system for controlling brake-application energy in a vehicle combination including a tractor vehicle equipped with an electronic braking system and a trailer vehicle, the tractor vehicle having front and rear axles, the trailer vehicle having at least one trailer axle, the system comprising:

means for determining, during braking of said vehicle combination, a set deceleration value, means for measuring, during braking of said vehicle combination, an actual deceleration value, means for comparing said set deceleration value with said actual deceleration value, means for determining a brake-application energy reference value from the comparison of said set deceleration value with said actual deceleration value, means for determining a brake-application energy level for said tractor vehicle and a brake-application energy level for said trailer vehicle, means for determining an axle-load for said rear axle of said tractor vehicle, means for generating sets of performance characteristics in said electronic braking system representing the dependencies of said brake-application energy level for said tractor vehicle and said brake-application energy level for said trailer vehicle on at least one of said brake-application energy reference value and said axle-load of said tractor vehicle, means for calculating a set brake-application energy value for said tractor vehicle based on (i) said set deceleration value, (ii) a value that is a function of said brake-application energy reference value, and (iii) said brake-application energy level for said tractor vehicle, in accordance with said sets of performance characteristics, means for calculating a set brake-application energy value for said trailer vehicle based on (i) said set deceleration value, (ii) said value that is a function of said brake-application energy reference value, and (iii) said brake-application energy level for said trailer vehicle, in accordance with said sets of performance characteristics, and means for distributing brake-application energy to said tractor vehicle and said trailer vehicle based on said set brake-application energy value for said tractor vehicle and said set brake-application energy value for said trailer vehicle.

* * * * *